United States Patent
Häger et al.

(10) Patent No.: US 7,879,938 B2
(45) Date of Patent: Feb. 1, 2011

(54) COMPOSITIONS COMPRISING AN ORGANIC POLYMER AS THE MATRIX AND INORGANIC PARTICLES AS THE FILLER, PROCESS FOR THE PREPARATION THEREOF AND APPLICATIONS OF THE SAME

(75) Inventors: Harald Häger, Lüdinghausen (DE); Franz-Erich Baumann, Dülmen (DE); Wolfgang Lortz, Wächtersbach (DE); Werner Höss, Shanghai (CN); Michael Wicker, Seeheim-Jugenheim (DE); Rüdiger Carloff, Darmstadt (DE); Uwe Schneider, Gross-Rohrheim (DE)

(73) Assignee: Evonik Degussa GmbH, Essen (DE)

( * ) Notice: Subject to any disclaimer, the term of this patent is extended or adjusted under 35 U.S.C. 154(b) by 818 days.

(21) Appl. No.: 11/822,862

(22) Filed: Jul. 10, 2007

(65) Prior Publication Data

US 2008/0242782 A1 Oct. 2, 2008

Related U.S. Application Data

(60) Provisional application No. 60/831,222, filed on Jul. 17, 2006.

(30) Foreign Application Priority Data

| Jul. 17, 2006 | (DE) | ................. | 10 2006 033 309 |
| May 5, 2007 | (DE) | ................. | 10 2007 021 199 |

(51) Int. Cl.
| *C08K 9/06* | (2006.01) |
| *C08L 69/00* | (2006.01) |
| *C08L 67/00* | (2006.01) |
| *C08L 77/00* | (2006.01) |

(52) U.S. Cl. ..................... 524/401; 524/497
(58) Field of Classification Search ............... 524/401, 524/497

See application file for complete search history.

(56) References Cited

U.S. PATENT DOCUMENTS

| 3,316,205 A | 4/1967 | Dien |
| 4,177,099 A | 12/1979 | Radzwill |
| 4,381,136 A | 4/1983 | Hosch et al. |
| 4,773,913 A | 9/1988 | Krieg et al. |
| 4,786,660 A | 11/1988 | Ittman et al. |
| 4,822,973 A | 4/1989 | Fahner et al. |
| 4,826,901 A | 5/1989 | Itmann et al. |
| 4,881,402 A | 11/1989 | Markert et al. |
| 4,957,987 A | 9/1990 | Krieg et al. |
| 5,206,496 A | 4/1993 | Clement et al. |
| 5,266,253 A | 11/1993 | Dijkhuizen et al. |
| 5,350,448 A | 9/1994 | Dietz et al. |
| 5,445,871 A | 8/1995 | Murase et al. |
| 5,449,727 A | 9/1995 | Krieg et al. |
| 5,504,133 A | 4/1996 | Murouchi et al. |
| 5,529,720 A | 6/1996 | Hayashi et al. |
| 5,629,404 A | 5/1997 | Smith et al. |
| 5,654,090 A | 8/1997 | Kayanoki |
| 5,684,120 A | 11/1997 | Torre |
| 5,690,872 A | 11/1997 | Krieg et al. |
| 5,696,202 A | 12/1997 | Torre |
| 5,716,553 A | 2/1998 | Bergmann et al. |
| 5,756,211 A | 5/1998 | Ittmann et al. |
| 5,761,111 A | 6/1998 | Glezer |
| 5,773,558 A | 6/1998 | Torre |
| 5,830,568 A | 11/1998 | Kondo |
| 5,834,549 A | 11/1998 | Suezaki et al. |

(Continued)

FOREIGN PATENT DOCUMENTS

DE      44 07 547 A1     9/1995

(Continued)

OTHER PUBLICATIONS

English abstract for DE 44 07 547, 1995.
English abstract for DE 100 54 859, 2002.
English abstract for DE 10 2004 008 202, 2004.
English abstract for WO2006/048089, (2006).
English abstract for WO2006/072496, (2006).
English abstract for WO2006/087248, (2006).
English abstract for WO2006/111302, (2006).
English language translation of JP 10016390, (1998).

(Continued)

*Primary Examiner*—Kelechi C Egwim
(74) *Attorney, Agent, or Firm*—Law Office of: Michael A. Sanzo, LLC

(57) ABSTRACT

Compositions comprising an organic polymer as the matrix and inorganic particles as the filler and exhibiting in mixture
a) 20 to 99.9% by wt. of an organic polymer and
b) 0.1 to 80% by wt. of inorganic particles,
    where the sum of the constituents a) and b) amounts to 100% by wt.; and optionally
c) 0 to 100 parts by weight of b) of various additives,
    in which case the content of the additives c) relates to the sum of a) and b), calculated as 100 parts by weight.
characterized in that the composition can be obtained by incorporating particles and optionally other additives into the polymer matrix, in which case the particles to be incorporated
i) are aggregates of globular primary particles;
ii) the size of the primary particles is in a range of 0.5 nm to less than 100 nm;
iii) the volume-weighted median value $d_{50}$ of the particles is in a range of greater than 0.50 µm to 0.5 µm, determined by means of static light scattering; and
iv) the inorganic particles are modified with functional groups, the inorganic particles exhibiting at least three types of functional groups of varying reactivity.

The compositions can be prepared in a number of way, for example, by reprecipitation from the dissolved state or by mixing in an extruder and are used for preparing fibers, films and shaped articles with improved mechanical properties.

20 Claims, No Drawings

U.S. PATENT DOCUMENTS

| | | | |
|---|---|---|---|
| 5,880,235 | A | 3/1999 | Schwind et al. |
| 5,882,560 | A | 3/1999 | Ittmann et al. |
| 5,886,087 | A | 3/1999 | Torre |
| 6,008,288 | A | 12/1999 | Torre |
| 6,133,342 | A | 10/2000 | Mizobuchi et al. |
| 6,214,917 | B1 | 4/2001 | Linzmeier et al. |
| 6,221,144 | B1 | 4/2001 | Dietz et al. |
| 6,277,911 | B1 | 8/2001 | Torre |
| 7,169,322 | B2 | 2/2002 | Lortz et al. |
| 6,374,737 | B1 | 4/2002 | Bennett et al. |
| 6,407,182 | B1 | 6/2002 | Maul et al. |
| 6,521,688 | B1 | 2/2003 | Linzmeier et al. |
| 6,537,479 | B1 | 3/2003 | Colea |
| 6,624,226 | B1 | 9/2003 | Servaty et al. |
| 6,663,683 | B2 | 12/2003 | Lortz et al. |
| 6,676,719 | B2 | 1/2004 | Lortz et al. |
| 6,759,458 | B2 | 7/2004 | Reil |
| 6,767,377 | B2 | 7/2004 | Schumacher et al. |
| 6,903,153 | B2 | 6/2005 | Wessels et al. |
| 6,991,190 | B2 | 1/2006 | Lortz et al. |
| 7,015,270 | B2 | 3/2006 | Scharfe et al. |
| 7,046,903 | B2 | 5/2006 | Schmidt et al. |
| 7,052,161 | B2 | 5/2006 | Lichtenstein |
| 7,060,737 | B2 | 6/2006 | Yamaguchi et al. |
| 7,074,351 | B2 | 7/2006 | Döbler et al. |
| 7,187,396 | B2 | 3/2007 | Carroll et al. |
| 7,288,585 | B2 | 10/2007 | Moad et al. |
| 7,374,743 | B2 | 5/2008 | Katusic et al. |
| 7,588,658 | B2 | 9/2009 | Yamamoto et al. |
| 2001/0036437 | A1 | 11/2001 | Gutsch et al. |
| 2002/0077380 | A1 | 6/2002 | Wessels et al. |
| 2002/0086926 | A1 | 7/2002 | Fisher |
| 2002/0176804 | A1 | 11/2002 | Strand |
| 2003/0012405 | A1 | 1/2003 | Hatta et al. |
| 2003/0045618 | A1 | 3/2003 | Koshida et al. |
| 2003/0054160 | A1 | 3/2003 | Fisher et al. |
| 2003/0099798 | A1 | 5/2003 | George et al. |
| 2003/0108734 | A1 | 6/2003 | Yano et al. |
| 2003/0124051 | A1 | 7/2003 | Servaty et al. |
| 2003/0130381 | A1 | 7/2003 | Joachimi et al. |
| 2003/0165680 | A1 | 9/2003 | Brady et al. |
| 2003/0206854 | A1 | 11/2003 | Gutsch et al. |
| 2004/0030384 | A1 | 2/2004 | Wissman |
| 2004/0045663 | A1 | 3/2004 | Katayama et al. |
| 2004/0106697 | A1 | 6/2004 | Lortz et al. |
| 2004/0110880 | A1 | 6/2004 | Sugawara et al. |
| 2004/0157972 | A1 | 8/2004 | Yamaguchi et al. |
| 2004/0191485 | A1 | 9/2004 | Groothues et al. |
| 2004/0209031 | A1 | 10/2004 | Kawase et al. |
| 2004/0213989 | A1 | 10/2004 | Hasskerl |
| 2005/0001419 | A1 | 1/2005 | Levy et al. |
| 2005/0124761 | A1 | 6/2005 | Schultes et al. |
| 2005/0137305 | A1 | 6/2005 | Carroll et al. |
| 2005/0169861 | A1 | 8/2005 | Lortz et al. |
| 2005/0224749 | A1 | 10/2005 | Lortz et al. |
| 2005/0288416 | A1 | 12/2005 | Lichtenstein et al. |
| 2006/0052515 | A1 | 3/2006 | Hoess et al. |
| 2006/0084723 | A1 | 4/2006 | Hartwig et al. |
| 2006/0104881 | A1 | 5/2006 | Lortz et al. |
| 2006/0121248 | A1 | 6/2006 | Lorenz et al. |
| 2006/0163533 | A1 | 7/2006 | Batz-Sohn et al. |
| 2006/0175735 | A1 | 8/2006 | Hoess et al. |
| 2006/0216441 | A1 | 9/2006 | Schubel et al. |
| 2006/0281846 | A1 | 12/2006 | Hager et al. |
| 2007/0003779 | A1 | 1/2007 | Katusic et al. |
| 2007/0056684 | A1 | 3/2007 | Yamamoto et al. |
| 2007/0145327 | A1 | 6/2007 | Lortz et al. |
| 2007/0173581 | A1 | 7/2007 | Hager et al. |
| 2007/0175362 | A1 | 8/2007 | Gutsch et al. |

FOREIGN PATENT DOCUMENTS

| | | |
|---|---|---|
| DE | 100 54 859 | 5/2002 |
| DE | 10 2004 008 202 | 2/2004 |
| DE | 20 2004 003 362 U1 | 6/2004 |
| JP | 10016390 | 1/1998 |
| JP | 2001233976 | 8/2001 |
| JP | 2003-246132 | 9/2003 |
| WO | WO02/060988 | 8/2002 |
| WO | WO 2005082994 A1 * | 9/2005 |
| WO | WO02/096982 | 12/2005 |
| WO | WO2006/048089 A1 | 5/2006 |
| WO | WO2006/058689 | 6/2006 |
| WO | WO2006/072496 | 7/2006 |
| WO | WO2006/087248 | 8/2006 |
| WO | WO2006/108743 | 10/2006 |
| WO | WO2006/111302 | 10/2006 |

OTHER PUBLICATIONS

English language translation of JP 2001233976, (2001).
English language abstract for JP 10016390, (1998).
English language abstract for JP 2001233976, (2001).
Screenshot of Sigma Aldrich's website showing the current prices of nanoparticle sized indium-tin oxide. Screenshot taken Friday, Mar. 28, 2008.
English language computer translation of DE 20 2004 003 362 U1, (2004).
English language computer translation of JP 2003-246132, (2003).
Ma, et al., "New Developments in Particle Characterization by Laser Diffraction: Size and Shape," *Powder Technology* 111:66-78 (2000).

* cited by examiner

COMPOSITIONS COMPRISING AN ORGANIC POLYMER AS THE MATRIX AND INORGANIC PARTICLES AS THE FILLER, PROCESS FOR THE PREPARATION THEREOF AND APPLICATIONS OF THE SAME

CROSS REFERENCE TO RELATED APPLICATIONS

The present application claims priority to, and the benefit of, U.S. provisional application 60/831,222 filed on Jul. 17, 2006 and to German applications 102006033309.8 (filed on Jul. 17, 2006) and 102007021199.8 (filed on May 5, 2007). The contents of these prior applications are hereby incorporated by reference in their entirety.

The present invention relates to the field of nanocomposites—that is, polymers, filled with nanofillers. In particular, the present invention relates to compositions comprising an organic polymer as the matrix and inorganic particles as the filler and exhibiting in mixture a) 20 to 99.9% by wt. of an organic polymer and
b) 0.1 to 80% by wt. of inorganic particles, where the sum of the constituents a) and b) amounts to 100% by wt.; and optionally c) 0 to 100 parts by weight of b) of various additives, in which case the content of the additives c) relates to the sum of a) and b), calculated as 100 parts by weight.

The invention also relates to a process for preparing such compositions and to applications of the same.

Today the demands on polymers and plastic molding compounds are constantly rising and expanding. Therefore, certain properties, such as the stiffness or the heat resistance, shall be specifically improved without any significant deterioration of the other properties of the polymers.

Thus, it is known that the stiffness and heat resistance of plastics can be increased by adding to the plastic either mineral fillers or ceramic fillers in the form of particles exhibiting particle sizes greater than 0.001 mm. Usually glass fibers are added today in order to achieve the desired effects.

Unfortunately this process often leads to a dramatic reduction in the impact strength and the ductility of polymers and the shaped articles that are obtained thereof. Therefore, there is a need for a solution that provides materials that exhibit a high strength and high heat resistance and are at the same time ductile and impact resistant.

With respect to the specific prior art, the following documents are cited:

D1=DE102004008202 (BASF AG);
D2=WO 2004/024811 (Fraunhofer-Gesellschaft);
D3=WO 02/096982 (Nelson, Yang);
D4=WO 2004/113436 (Polymers Australia Pty. Ltd);
D5=US 2003/0099798 (George, Ballard);
D6=US 2003/0108734 (Nissan Motor Co. Ltd.)

D1 relates to composites comprising thermoplastics and monodispersed fillers. Described is the modification of a matrix comprising a thermoplastic polymer with spherical, organically modified nanofillers. In a first step the nanofillers exist as agglomerates. These agglomerates disintegrate in the surface modification reaction, a feature that can be further promoted by the input of mechanical energy. Then the modified nanofillers are incorporated into the polymer matrix, for example, by means of a kneading process into the melt of the matrix polymer. The $d_{50}$ value of the particles should be, according to D1, in a range of 2 to 250 nm; and the resulting molding compounds should have significantly improved mechanical properties—for example, improved elongation at break and modulus of elasticity, as compared to unfilled molding compounds. However, the examples of D1 appear to document that this does not always occur in all cases. Hence, with the use of polybutyleneterephthalate as the matrix polymer, the result is merely an improvement in the modulus of elasticity in a range of approximately 10%. With the use of polyamide 6 as the matrix polymer, a doubling of the value for the modulus of elasticity is achieved, but the elongation at break does not appear to be improved or is only negligibly improved. In addition, neither the (notched) impact strength nor the temperature stability of the resulting composites was examined in the tests shown in D1.

D2 devotes itself to a process for the preparation of nanocomposites, in which agglomerated nanofillers are organically modified in an organic solvent with silane, chlorosilane, silazane, titanate and/or zirconate; and then these modified nanofillers are incorporated in a number of different ways into an organic binder. The test of the mechanical properties of the composites is limited to determining the abrasion resistance in accordance with the principal purpose for using the nanocomposites of D2 as paint constituents. For both the epoxide and acrylate matrices the test showed significantly less dust as compared to unfilled base resins. D2 also mentions the possibility of incorporating by polymerization the surface-modifying particles by means of groups of surface modifiers (that can be incorporated by polymerization) into a polymer matrix. Other mechanical properties are not tested.

D3 describes the preparation through extrusion of organic/inorganic nanocomposites exhibiting improved properties. In one embodiment inorganic additives are surface modified; the modified additives are mixed with a polymer solution; the solvent is removed; and the resulting concentrate is processed together with a plastic. Nanocomposites that are obtained in such a manner exhibit improved mechanical properties, compared to unfilled plastics. However, in the case of PMMA it becomes apparent that the values for unfilled PMMA are extremely poor. In this respect the mechanical characteristic values, which are obtained and underlie the tests, are not comparable to pure PMMA. Apparently a flexible acrylate binder was used here and incorrectly termed PMMA.

D4 relates to the preparation of composite materials comprising polymers and phyllosilicates. A block copolymer-based dispersing agent, which is prepared specifically for this purpose, is essential in order to obtain a good distribution of the phyllosilicate in the polymer matrix.

D5 discloses nanocomposite-reinforced polymers and blends.

D6 describes a copolymer, based on methacrylate monomers, which additionally contain a functional group, which is supposed to interact with the hydroxy functions on the surface of a hydrophobized metal oxide by means of hydrogen bridge bonds.

With regard to the prior art, the object of the invention was to provide polymer materials exhibiting an improved property profile.

One object of the invention also consisted of providing compositions comprising nanoparticle-filled polymers, so that, compared to the unfilled polymer, the filled polymer materials shall exhibit both an enhanced stiffness and heat resistance as well as an enhanced impact strength and ductility.

Another object of the invention was to improve the stiffness and heat resistance in polymers, which by nature are already ductile and impact resistant—such as PA12—without having a negative impact on the high level of ductility and impact strength.

Another particular object of the invention was also to provide compositions, which, compared to nanoparticle-filled compositions from the prior art, exhibit constant good stiffness and heat resistance, but compared to the filled compositions from the prior art, the impact strength and ductility are subject to a lesser extent or are not subject at all to negative effects and preferably are even significantly improved.

Another object of the invention consisted of providing a process for preparing in an easier and better way such polymer materials.

Finally, it was also the object of the invention to provide applications for the improved compositions of the invention.

These proposed objects and other objects, which are not literally stated, but which, nevertheless, can be easily derived from the introductory explanations, can be achieved by compositions exhibiting all of the features of claim 1. Preferred mixtures are the subject matter of claims, which refer back to claim 1. With respect to the process the independent process claim offers a solution for the problems, on which the invention is based from a process engineering viewpoint. Applications are placed under the protection sought in the claims of the corresponding category.

Since compositions of the aforementioned type can be obtained by incorporating particles and optionally other additives into the polymer matrix, where i) the particles to be incorporated are aggregates of globular primary particles;
ii) the size of the primary particles is in a range of 0.5 nm to <100 nm;
iii) the volume-weighted median value $d_{50}$ of the particles is in a range of >0.05 μm to 0.5 μm, determined by means of static light scattering;
iv) the inorganic particles are modified with functional groups, the inorganic particles exhibiting at least three types of functional groups of varying reactivity;

the property profile of nanoparticle-filled polymer compositions can be improved in a way that could not be foreseen without effort so that their processing is easier and at the same time the shaped articles that are produced thereof exhibit an improved spectrum of product properties.

The quantity ratio between organic polymer and inorganic polymer can be varied over a wide range in the inventive composition. For certain applications it can suffice to use 0.1% by wt. or slightly more of the particles that can be used for the purpose of the invention. Below 0.1% by wt., however, it is possible only with difficulty to achieve a measurable improvement in the property profile of the compositions of the invention. The improvements are much more distinct in compositions, which are characterized in that they comprise an organic polymer a) in an amount ranging from 20 to 99.5% by wt. and inorganic particles b) in an amount ranging from 0.5 to 80% by wt.

Furthermore, preference is given to such compositions that comprise an organic polymer a) in an amount ranging from 40 to 99.5% by wt. and inorganic particles b) in an amount ranging from 0.5 to 60% by wt.

Even more preferred are compositions, comprising inorganic particles in an amount ranging from 0.5 to 50% by wt. and particularly preferably 1 to 50% by wt., together with 50 to 99.5% by wt. of an organic polymer and/or 50 to 99% by wt. of an organic polymer. It is extremely practical to use compositions, comprising 60 to 95% by wt. of a polymer and 5 to 40% by weight of inorganic particles.

Within the scope of the invention, it has turned out very surprisingly that both the mechanical properties of the composition and its processing can be positively influenced by adding to the organic polymers very specific inorganic particles as fillers.

The inorganic particles, which can be added within the scope of the invention, are agglomerates of essentially globular primary particles, the size of the primary particles themselves being in the nano range. What is meant here is a range of size between 0.5 and 100 nm, preferably 1 to 50 nm and especially practical 5 to 30 nm. The primary particles are generally agglomerated into agglomerates or aggregates before incorporating into the polymer matrix. The aggregates usually exhibit a size in a range of greater than 0.05 μm up to 0.5 μm, preferably 0.1 μm up to 0.3 μm and expediently 0.15 μm to 0.25 μm. These values are the volume-weighted median value $d_{50}$ of the particle size distribution, determined by means of static light scattering. The particles are added to the polymer in such a manner that a particle distribution that has been set once experiences only such changes that modify only insignificantly the desired improvement in the property profile.

Of interest for the choice of the particles, which can be used successfully in the invention, is also the circumstance that the particles exhibit an internal surface. In order to reach the internal surface, the particles have preferably a fractality in a range of 2 to less than 3, especially preferably less than 2.8 and particularly preferably less than 2.5. For the purpose of the invention, the fractality is determined according to the method, described in DE 197 56 840, by means of $N_2$ adsorption in a pressure range $p/p_o$ of 0.5 to 0.8. The results of the measurements are evaluated according to the fractal BET theory for the multi-charge adsorption, according to the method proposed by Pfeifer, Obert and Cole (Proc. R. Soc. London, A423, 169 (1989).

Another practical variation of the invention provides that the inorganic particles, contained in the inventive composition, are modified with functional groups. Especially advantageous in this respect are such inorganic particles that are modified on their surface with organic groups. In this case preference is given to such blends that are characterized in that the inorganic particles exhibit groups, which can interact with the polymer in the manner of a van der Waals bond, hydrogen bridge bond, an electrostatic bond, ionic bond and/or coordinative bond and/or can enter with the polymer into a covalent bond. Since the particles are modified in such a way that they carry functional groups, which enable a positive interaction in the manner of a van der Waals bond and/or a hydrogen bridge bond and/or an electrostatic bond and/or an ionic bond and/or a coordinative bond and/or a covalent bond between the particle and the polymer, it is possible, inter alia, to achieve an excellent bonding of the particles to the polymer matrix.

Of special and essential interest are the compositions, in which the inorganic particles that are contained exhibit at least three types of functional groups of varying reactivity. This feature promotes in a practical way a good bonding of the particles to the polymer matrix in all phases of the preparation and processing process.

An especially practical variant of the invention provides a composition, which contains inorganic particles, which are modified in such a manner that they have both OH groups and also mineral acid groups, such as chloride, phosphate and the like, as well as organic groups.

The starting particles, which can be used with success within the scope of the invention, include, inter alia, other oxidic, nitridic and carbidic metal and semi-metal compounds. The preferred compounds include, inter alia, aluminum oxide (in the alpha, gamma, delta and theta modification and blends comprising two or more of the said modifications), zirconium dioxide, yttrium-doped zirconium dioxide, titanium dioxide (as rutil, anatase or brookite and in mixture of two or three of the said modifications), silicon dioxide (also as mixed oxide with aluminum oxide and/or titanium dioxide), antimony oxide, zinc oxide, cerium oxide, iron oxides, palladium dioxide, as well as mixed oxides or at least two of the said compounds. Furthermore, preference is also given to indium tin oxide, antimony tin oxide. Practical inorganic particles also comprise materials of the spinel type, like aluminum spinels, iron spinels, iron, chromium spinels, titanium spinels and cobalt spinels. In addition, ceramic particles, like boron nitride, boron carbide, silicon carbide, silicon nitride, and mixtures thereof, are also of interest. All of the cited compounds can also be used as mixed compounds (such as mixed oxides) and/or mixture of at least two compounds. Even the common use of one or more mixed compounds in mixture with one or more compounds can be preferred.

In particular, the agglomerated particles, which are to be used as the starting material, are oxidic or nitridic compounds, which were prepared by flame pyrolysis or by precipitation. However, differently-based agglomerated particles, such as barium sulfate or barium titanate, are also suitable. It is preferred to use oxides; and especially preferred to use aluminum oxide, prepared by flame pyrolysis.

The surface of the inorganic particles can be modified, as stated above. This can be done in any arbitrary way. Preferably the surface modification is carried out in a solvent. The solvent, in which the modification of the particles is carried out, is preferably a polar protic solvent; and particularly preferred are methanol, ethanol, propanol, isopropanol and carvacrol. However, polar aprotic solvents, like dimethylacetamide, N-methylpyrrolidone, dimethyl formamide, dimethyl sulfoxide, acetone, butanone, ethyl acetate, methyl isobutyl ketone, tetrahydrofuran, chloroform, dichloromethane, and/or diisopropyl ether can also be used. Furthermore, the direct modification in the organic binders, which are to be used, if desired, for the preparation of the compositions of the invention, is an advantageous method. In this case the monomers, which are to be polymerized, as the individual components or as the formulation are the solvent that is to be used.

An acid, such as hydrochloric acid, can be added as the catalyst to the solvent. However, depending on the targeted purpose, the quality of the compositions that are produced can be better if no acid is added. In each case it is advantageous for catalytic amounts of water to be present preferably in a range from 0.1% to 5%, in order to carry out the modification. This water is often already present as an adsorbate on the surface of the agglomerated particles, which are used as the starting material. In order to assist the reaction, other water, such as in the form of a diluted acid, can also be added.

The surface can be modified preferably with phosphoric acid, phosphorous acid, hypophosphorous acid, phosphonic acid, sulfonic acid, sulfuric acid, sulfurous acid, boric acid and oxo acids on the basis of tin and bismuth compounds. The aforementioned acids can also contain organic groups of the alkyl, aryl and cycloalkyl type, where these groups in turn can carry functional groups. In this case preference is given to such organic acids that also carry at least one free acid group.

Particular preference is given to a surface modification of the particles with a combination of one or more of the aforementioned inorganic acids with one or more organically modified acids, preferably one or more of the said organically modified acids.

It is particularly preferred to modify the surface of the particles with a mixture comprising inorganic acid and organically modified acid in such a manner that the particle surfaces are only partially coated with the aforementioned modifiers. The results are particle surfaces, which exhibit at least three different functional groups—for example, free OH groups of the particle, mineral acid groups and organic modification.

An organic modification of the surface can also take place by treating with a siloxane, chlorosilane, silazane, titanate or zirconate or mixtures thereof, preferably in a solvent. They have preferably the general formula:

$$Si(OR')_n R_{4-n}, SiCl_n R_{4-n}, (R_m R''_{3-m} Si)_2 NH, Ti(OR')_n R_{4-n}, \text{ and } Zr(OR')_n R_{4-n}, \text{ where}$$

R', R" is the same or different, hydrocarbon groups having 1 to 8, preferably 1 to 4 carbon atoms; R is an unsaturated or saturated hydrocarbon group having 1 to 150, preferably 1 to 50 carbon atoms, which carry at least one epoxy-, hydroxyl-, amino-, carboxyl-, (meth)acrylate-, isocyanate-, thiol-, glycidyl- or aromatic group having 5 to 20 carbon atoms, preferably 6 to 10 carbon atoms; m is 1, 2, or 3 and n stands for 1, 2, or 3.

As in the case of R", the group R', which is bound via the oxygen, is any organic functional group, preferably an alkyl group and particularly preferably methyl, ethyl or isopropyl. These groups are cleaved in the form of the alcohol during the organic modification. In the case of a modification with a silazane, ammonia is cleaved; and in the case of the chlorosilane, hydrochloric acid is cleaved. Generally the alcohol that is formed, the hydrochloric acid or the ammonia is no longer contained in the composition, which is prepared in the subsequent steps and which comprises polymer and particles.

The functional group R is preferably any organic group and is bound directly via a carbon atom to the silicon, titanium or zirconium. When n or m is 1 or 2, the groups R can be the same or different. R is preferably selected in such a manner that the group can react chemically with the monomer and/or polymer that is used for preparing the composition of the invention or has a high affinity thereto.

Particularly suitable for polyamides, polyesters and polycarbonates are phosphonic acid compounds, which carry the organic groups R—COOH, R—OH, R—NH2, R-alkyl, R-vinyl, R-aryl or combinations thereof. The number of organic groups can range from 0 to 10, preferably from 1 to 5, particularly preferably from 1 to 3.

Suitable for polyamides, polyesters and polycarbonates are also the silane compounds of the general formula $$(X-(CH_2)_n)_k Si(O-C_m H_{2m+1})_{4-k},$$

where the substituents have the following meaning:

X is $NH_2-$, $CH_2\underset{O}{\overset{\diagdown\diagup}{-}}CH-$, HO—, benzyl-, vinyl-, phenyl;

n is a whole number from 0 to 10, preferably 0 to 4; m is a whole number from 1 to 5, preferably 1 to 2; k is a whole number from 1 to 3, preferably 1.

Especially preferred silane compounds are aminopropyl trimethoxysilane, aminobutyl trimethoxysilane, aminopropyl triethoxysilane, aminobutyl triethoxysilane and the corresponding silanes, which contain as the substituent x a glycidyl group, as well as phenyl triethoxysilane and phenyl trimethoxysilane and also silane-functionalized polymers (for example, silane-terminated polystyrene or PMMA).

For the preparation of compositions based on acrylates or methacrylates, R contains preferably an acrylate group or methacrylate group and is especially preferred to be —(CH$_2$)$_3$—S—(CH$_2$)$_2$—C(=O)O—(CH$_2$)$_n$—OC(=O)—CH=CH$_2$, where n=1 to 12 and —(CH$_2$)$_3$—OC(=O)—C(CH$_3$)=CH$_2$.

For the preparation of compositions, based on epoxides, R contains preferably an epoxide group or an amino group, carboxylic acid group, thiol group, or alcohol group, which can react with an epoxide group. In this case R is particularly preferred to be 2-(3,4-epoxycyclohexyl)ethyl, 3-glycidoxypropyl, 3-aminopropyl and 3-mercaptopropyl.

In the preparation of compositions, based on unsaturated polyesters or styrene-containing resins, R contains preferably a reactive double bond. In this application R is especially preferred to be vinyl or styryl or contains a vinyl group or styryl group.

In order to prepare compositions, based on urethanes, polyureas or other polymer systems based on isocyanates, R contains preferably an isocyanate group, amino group, alcohol group, thiol group or carboxylic acid group. In this case R is especially preferred to be 3-isocyanatopropyl, 3-aminopropyl and 3-mercaptopropyl.

Of special interest are compositions with modified particles, in which the particles exhibit different types of functional groups and/or the same types of functional groups, but of different reactivity. Thus, in a variant it can be practical for the composition, comprising the organic polymer and the inorganic particles, to comprise such particles that are modified with three different groups R, where the groups R come from three different classes of compounds—for example, the amino group, thiol group and alcohol group. In another variant, it can be advantageous to use the particles with three or more functional groups, where the functional groups come from one and the same chemical class of substances—for example, the class of alcohols—, but which owing to the chain length of the alkyl groups the reactivity of the individual groups R differs from the alcohols—for example, the methyl group, ethyl group and propyl group. Mixed types can also be used, as long as it remains guaranteed that the groups R have varying reactivity.

During the preparation of the compositions, the inorganic, preferably organically modified particles, which can be used with success in the compositions of the invention, can be used alone or as a combination of particles, exhibiting different substances, or particles, exhibiting identical substances, with different particle size distribution. In order to be able to achieve especially high filler contents, it is advisable to combine particles of different particle size distribution and optionally even to add microfillers.

One advantageous further development of the invention is the modification of the surface of the particles with dyes. In this case the group R of the siloxane, silazane, titanate or zirconate that is used for the modification is a dye or can react with a dye. The binding of the dye to the surface of the particles can take place by means of both a covalent bond and an ionic bond.

It has been demonstrated that plastic components and paints that contain the particles, modified with dyes, have a better fading resistance than the plastic components and paints that contain the same dyes without binding to the particles. In this manner it is possible to make available transparent polymer materials that are dyed so as to be fade resistant.

In order to accelerate the breakdown of the agglomerates during the organic modification in the organic solvent, an additional input of mechanical energy can be carried out with the customary methods before or during the modification. This can be carried out, for example, by means of ultrasound, a high-speed stirrer, a dissolver, a bead mill or a rotor-stator mixer. This is the preferred method when higher viscosity solvents are used, particularly when the organic binders for the preparation of the composition is used directly as a solvent. If the binder is not used as a solvent, the binder that is to be used can be poured directly with the dispersion of the organically modified particles into the organic solvent. In this case the solvent is drawn off after the preparation of the mixture of binder and organically modified particles or not until the later use of the composition comprising polymer (binder or matrix) and particles. The latter is a viable method, especially with the use of solvent-containing paints based on the compositions of the invention. However, the organically modified particles are freed of the solvent and further processed as a dry powder.

In this case the dry, organically modified particles are then added to the polymer (binder) and incorporated with the simultaneous input of mechanical energy. The incorporation can be carried out, for example, by ultrasound, a high speed stirrer, a dissolver, a bead mill, a roller mill, or a rotor-stator mixer.

In the preparation of compositions with thermoplastics as the polymer (binder), the preferably organically modified inorganic particles are incorporated into the monomers, on which the polymer is based. Then these monomers are polymerized in a conventional manner so that the results are the compositions, according to the invention. For example, organically modified inorganic particles are incorporated into methyl methacrylate. In the subsequent polymerization, the result is a filled polymethyl methacrylate. In contrast to the conventionally filled polymethyl methacrylate, however, this filled polymethyl methacrylate can be transparent and can have (compared to the unfilled material and a PMMA, filled in the conventional manner) improved mechanical properties (for example, scratch resistance, tensile strength, and flexural strength). Another example is a composition based on polystyrene as the binder. In this case the organically modified particles are incorporated into styrene and then polymerized in the conventional manner. If a siloxane, chlorosilane, silazane, titanate or zirconate, in which the group R can polymerize together with the monomer, is used in the modification of the nanofillers, the composition that is formed is crosslinked. Thus, it is a copolymer. In this case, the organically modified particles act as crosslinker particles. If the groups R cannot react with the monomer, the composition that is formed is preferably thermoplastic.

In addition to the modification of the particles, the polymer can also be modified in such a way that one of the aforementioned positive interactions with the particles is possible. In addition to polymers, which permit per se good interaction with a polar particle surface, copolymers can also be prepared that contain small amounts of a functional group. In this case the copolymers can be prepared by incorporating the comonomers into the main chain of the polymer as well as also by grafting to the main chain of the polymer. At the same time the functional groups can be arranged in a random or regular manner. The amount of functional groups can range from 0.01 to 10 mol %, preferably from 0.05 to 5 mol % and especially preferably from 0.1 to 3 mol %.

Polymers, which have per se good interaction with the above-described particles, are, for example, those with carbonamide groups, like polyamides and copolyamides, furthermore polymers with hydroxy functions, like polyvinyl alcohol, ethylene vinyl alcohol or partially saponified polyvinyl acetate and copolymers thereof, additionally polymers with pyrrolidone groups, carboxyl acid groups, carboxylic acid amide groups, carboxylic acid chloride groups or carboxylic acid hydride groups in the side chain, moreover polymers with amino functions and silane functions in the side chain, finally also polymers, which contain double or triple bonds in the main or side chain of the polymer.

Therefore, preferred combinations are also those, in which the particles exhibit at least three functional groups of different reactivity, and the polymer per se exhibits good interactions with the aforementioned particles.

The Essential Constituents a)

The compositions of the invention contain as the component a) 20 to 99.9, preferably 40 to 99.5 and especially preferably 50 to 99 percent by weight of a polymer or a mixture of polymers, based on the sum of a)+b), which amounts to 100 percent by weight.

Basically the advantages that can be achieved with the invention become apparent in a plurality of polymer substances and materials. A listing of appropriate polymers can be found, for example, in "Plastics Handbook" (published by Saechtling), 1989 edition, which also gives reference sources. Processes for preparing polymers and copolymers are known per se.

For the purpose of the invention, particular polymers include, inter alia, polyamides, copolyamides and polyaramides.

For the composition of the invention useful polyamides exhibit in general a viscosity number ranging from 90 to 350, preferably 110 to 240 ml/g, determined in a 0.5% by weight solution in 96% by wt. of sulfuric acid at 25 deg. C., in accordance with ISO 307 or according to corresponding standards, for example in the case of polyamides with low carbonamide group density (PA612, PA12) in m-cresol.

Semi-crystalline or amorphous resins having a molecular weight (weight average) of at least 5,000, as described, for example, in the American patents U.S. Pat. Nos. 2,071,250, 2,071,251, 2,130,523, 2,130,948, 2,241,322, 2,312,966, 2,512,606 and 3,393,210, are also preferred.

Polyamide elastomers are also very suitable; for their hard blocks, weight average molecular weights in a range of 400 to 5,000 are preferred, especially practical approximately 1,000. For the invention, especially preferred polyamides can be derived from lactams, aminocarboxylic acids or diamines and dicarboxylic acids. In addition, polyamides can contain components, which act in a branching manner and which are derived, for example, from tricarboxylic acids, triamines or polyethylenimine.

Other preferred examples include polyamides, which are derived from lactams having 7 to 13 ring members, like polycaprolactam, polycapryl lactam and polylaurinolactam as well as polyamides, which are obtained by reacting dicarboxylic acid with diamines.

Alkanedicarboxylic acids having 4 to 20, preferably 6 to 12, in particular 6 to 10 carbon atoms and aromatic dicarboxylic acids can be used as dicarboxylic acids. In this case only adipic acid, azelaic acid, sebacic acid, dodecanedioic acid and terephthalic acid and/or isophthalic acid are named as the acids.

Suitable diamines are especially alkanediamines having 6 to 12, in particular 6 to 8 carbon atoms and m-xylylenediamine, di-(4-aminophenyl)methane, di-(4-aminocyclohexyl)-methane, 2,2-di(4-amino-phenyl)-propane or 2, 2-1-(4-aminocyclohexyl)-propane.

Preferred polyamides are polyhexamethylene adipic acid amide, polyhexamethylene sebacic acid amide and polycaprolactam as well as copolyamides 6/66, in particular with a content of caprolactam units ranging from 5 to 95% by weight.

In addition, polyamides, which can be obtained, for example, by condensation of 1,4-diaminobutane with adipic acid at a raised temperature (polyamide-4,6) are also mentioned. The preparation processes for polyamines of this structure are described, for example, in the EP-A 38 094, EP-A 38 582 and EP-A 39 524.

Furthermore, polyamides, which can be obtained by copolymerization of two or more of the aforementioned monomers, or mixtures of several polyamides are suitable, the mix ratio being arbitrary.

Furthermore, such partially aromatic copolyamides, like PA 6/6T and PA 66/6T (their triamine content is less than 0.5, preferably less than 0.3% by wt.), have proven to be especially advantageous. (See EP-A 299 444).

The preferred partially aromatic copolyamides with a low triamine content can be prepared according to the processes, described in the EP-A 129 195 and 129 196.

The types of polyamides and copolyamides that are especially practical for the invention include, as the homopolymer or as the copolymer, inter alia, PA6, PA66, PA610, PA66/6 and particularly PA612, PA1010, PA1012, PA1212, PA613, PA614, PA1014, PA11, PA12 or a transparent polyamide. Suitable transparent polyamides are, for example:

- the polyamide made from terephthalic acid and the isomer mixture of 2,2,4- and 2,4,4-trimethylhexamethylenediamine,
- the polyamide made from isophthalic acid and 1,6-hexamethylenediamine,
- the copolyamide made from a mixture comprising terephthalic acid/isophthalic acid and 1,6-hexamethylenediamine,
- the copolyamide made from isophthalic acid, 3,3'-dimethyl-4,4'-diaminodicyclohexylmethane and laurinolactam or caprolactam,
- the (co)polyamide made from 1,12-dodecanedioic acid, 3,3'-dimethyl-4,4'-diaminodicyclohexylmethane and optionally laurinolactam or caprolactam,
- the copolyamide made from isophthalic acid, 4,4'-diaminodicyclohexylmethane and laurinolactam or caprolactam,
- the polyamide made from 1,12-dodecanedioic acid and 4,4'-diaminodicyclohexylmethane,
- the copolyamide made from a terephthalic acid/isophthalic acid mixture, 3,3'-dimethyl-4,4'-diaminodicyclohexylmethane and laurinolactam.

Furthermore, the polyether amides, respectively polyether ester amides, based on lactams, aminocarboxylic acids, diamines, dicarboxylic acids and polyether diamines and/or polyether diols are suitable. For the purpose of the invention polyaramides can contain, for example, para- or meta-phenylenediamine and terephthalic acid or isophthalic acid units in approximately stoichiometrically equivalent quantities or also p-aminobenzoic acid units.

Other polymers of the type a) comprise polyesters and polycarbonates.

In general polyesters a) based on aromatic dicarboxylic acids and an aliphatic or aromatic dihydroxy compound are used. It is advised to use polyesters, like polyethylene terephthalate (PET), polyethylene naphthalate (PEN), polybutylene terephthalate (PBT), polybutylene naphthalate (PBN), polytrimethylene terephthalate (PT and/or polytrimethylene naphthalate (PTN) or also polyesters made from diols having 2 to 50 carbon atoms and dicarboxylic acids having 2 to 50 carbon atoms. In this case the diols and dicarboxylic acids can be of an aliphatic, alicyclic and/or acrylic nature.

A group of preferred polyesters is that of polyalkylene terephthalates, whose alcohol moiety has in particular from 2 to 10 carbon atoms. Such polyalkylene terephthalates are known per se and are described in the literature. Their main chain contains an aromatic ring, which derives from the aromatic dicarboxylic acid. There can also be substitutions of the aromatic ring, for example, by halogen, such as chlorine and bromine, or by $C_1$ to $C_4$— alkyl groups, like methyl-, ethyl-, i- and/or n-propyl- and n-, i- and/or t-butyl groups.

These polyalkylene terephthalates can be prepared by reacting aromatic dicarboxylic acids, their esters or other ester-forming derivatives, with aliphatic dihydroxy compounds in a manner that is known per se. Preferred dicarboxylic acids are 2,6-naphthalene carboxylic acid, terephthalic acid and isophthalic acid or mixtures of these. Up to 30 mol %, preferably no more than 10 mol %, of the aromatic dicarboxylic acids can be replaced with aliphatic or cycloaliphatic dicarboxylic acids, like adipic acid, azelaic acid, sebacic acid, dodecanedioic acids and cyclohexanedicarboxylic acids.

Preferred aliphatic dihydroxy compounds are diols having from 2 to 8 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol and neopenyl glycol or mixtures thereof.

Especially preferred polyesters a) are polyalkylene terephthalates, which are derived from alkanediols having from 2 to 6 carbon atoms. Of these, polyethylene terephthalate, polypropylene terephthalate and polybutylene terephthalate or mixtures thereof are especially preferred. Furthermore, preference is also given to PET and/or PBT, which comprise, as other monomer units, up to 1% by wt., preferably up to 0.75% by wt. of 1,6-hexanediol and/or 2-methyl-1,5-pentanediol. Very particular preference is given to polyalkylene terephthalates, which comprise a functional monomer, such as sodium-5-sulfoisophthalic acid.

The viscosity number of the polyesters a) is generally in a range from 50 to 220, preferably from 80 to 160 (measured in a 0.5% by wt. strength solution in a phenol/o-dichlorobenzene mixture (weight ratio 1:1 at 25 deg. C.) in accordance with ISO 1628).

Particular preference is given to polyesters, whose carboxyl end group content amounts up to 100 mval/kg, preferably up to 50 mval/kg and particularly up to 40 mval/kg of polyester. Such polyesters can be prepared, for example, according to the process, described in the DE-A 44 01 055. The carboxyl end group content is usually determined by titration methods (for example, potentiometry).

Especially preferred compositions comprise, as component a), a mixture of polyesters, which are different from PBT, such as polyethylene terephthalate (PET) and/or polycarbonate. The proportion of, for example, the polyethylene terephthalate and/or the polycarbonate in the mixture is preferably up to 50, in particular 10 to 30% by wt., based on 100% by wt. of a).

Furthermore, it is advantageous to use recycled PET materials (also called scrap PET), if desired, in a mixture with polyalkylene terephthalates, like PBT.

Recycled materials are generally defined as:

so-called post industrial recycled materials: in this case they are production wastes generated during polycondensation and during processing, for example, sprues during the injection molding processing, startup material during the injection molding processing or extrusion or edge trims of extruded sheets or films;

so-called post consumer recycled materials: in this case they are plastic items, which are collected and treated after utilization by the end consumer. The items, which dominate by far in terms of quantity, are the blow molded PET bottles for mineral water, soft drinks and juices.

Both types of recycled materials can be used as either ground material or in the form of pellets. In the latter case the crude recycled materials are isolated and cleaned and then melted and pelletized using an extruder. This usually facilitates the handling, the flowability and the meterability for the other processing steps.

Both types of recycled materials can be used either in the form of pellets or ground materials, in which case the maximum edge length should be 6 mm and preferably 5 mm.

Owing to the hydrolytic cleavage of polyesters during processing (due to traces of moisture) it is advised to predry the recycled material. The residual moisture content after drying ranges from preferably 0.01 to 0.7, in particular 0.2 to 0.6%.

Another group, which must be mentioned, is that of fully aromatic polyesters, which derive from aromatic dicarboxylic acids and aromatic dihydroxy compounds. Suitable aromatic dicarboxylic acids are those compounds that have already been described for the polyalkylene terephthalates. The mixtures that are preferably used are made from 5 to 100 mol % of isophthalic acid and 0 to 95 mol % of terephthalic acid, in particular mixtures from approximately 80% terephthalic acid with 20% isophthalic acid up to about equivalent mixtures of these two acids.

The aromatic dihydroxy compounds have preferably the general formula:

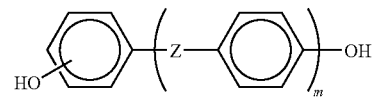

where Z denotes an alkylene or cycloalkylene group having up to 8 carbon atoms, an arylene group having up to 12 carbon atoms, a carbonyl group, a sulfonyl group, an oxygen atom or sulfur atom or a chemical bond; and where m has the value 0 to 2. The compounds can also carry $C_1$-$C_6$ alkyl- or alkoxy groups and fluorine, chlorine or bromine as substituents at the phenylene groups.

Examples of the parent substances of these compounds are dihydroxydiphenyl, di-(hydroxyphenyl) alkane, di-(hydroxyphenyl)cycloalkane, di-(hydroxyphenyl) sulfide, di-(hydroxyphenyl)ether, di-(hydroxyphenyl) ketone, di-(hydroxyphenyl) sulfoxide, alpha, alpha'-di-(hydroxyphenyl)-dialkylbenzene, di-(hydroxyphenyl) sulfone, di-(hydroxybenzoyl)benzene, resorcinol and hydroquinone and their nucleus-alkylated or nucleus-halogenated derivatives.

Of these, preference is given to 4,4'-dihydroxydiphenyl, 2, 4-1-(4'-hydroxyphenyl)-2-methylbutane, a,a'-di-(4-hydroxyphenyl)-p-diisopropylbenzene, 2,2-di-(3'-methyl-4'-hydroxyphenyl) propane and 2,2-di-(3'-chloro-4'-hydroxyphenyl) propane, and in particular 2,2-di-(4'-hydroxyphenyl) propane, 2,2-di-(3',5-dichlorodihydroxyphenyl) propane, 1,1-di-(4'-hydroxyphenyl)cyclohexane, 3,4'-dihydroxybenzophenone, 4,4'-dihydroxydiphenyl sulfone and 2,2-di-(3',5'-dimethyl-4'-hydroxyphenyl) propane or mixtures of these.

Of course, mixtures of polyalkylene terephthalates and fully aromatic polyesters and/or polycarbonates can also be used. They generally comprise from 20 to 98% by wt., preferably 50 to 96% by wt. of the polyalkylene terephthalate and 2 to 80% by wt., preferably 4 to 50% by wt., of the fully aromatic polyester and/or of the polycarbonate.

Of course, polyester block copolymers, like copolyether esters, can also be used. Such products are known per se and described in the literature, for example, in the U.S. Pat. No. 3,651,014. Corresponding products are also commercially available—for example, Hytrel® (DuPont).

Furthermore, halogen-free polycarbonates are used preferably as the component a). Examples of suitable halogen-free polycarbonates are those that are based on diphenols. The diphenols can also have substituents, like $C_1$- to $C_6$-alkyl or $C_1$- to $C_6$-alkoxy, at the phenylene groups. Examples of preferred diphenols are hydroquinone, resorcinol, 4,4'-dihydroxydiphenyl, 2,2-bis-4-hydroxyphenyl)-propane (bisphenol A), 2,4-bis-4-hydroxyphenyl)-2-methylbutane, 1,1-bis-(4-hydroxyphenyl)-cyclohexane. Particular preference is given to 2,2-bis-(4-hydroxyphenyl)-propane and 1,1-bis-(4-hydroxyphenyl)-cyclohexane as well as 1,1-bis-(4-hydroxyphenyl)-3,3,5-trimethylcyclohexane.

Both homopolycarbonates and copolycarbonates are suitable as the component a); preferred are, besides bisphenol A homopolymerizate, the copolycarbonates of bisphenol A.

The suitable polycarbonates can be branched in a well known manner; and in particular preferably by incorporating from 0.05 to 2.0 mol %, based on the sum of the diphenols that are used, in at least trifunctional compounds, for example those with three or more than three phenolic OH group, particularly preferably with pentaerythritol.

Such polycarbonates that exhibit relative viscosities $eta_{rel}$ ranging from 1.10 to 1.50, particularly from 1.25 to 1.40, have proven to be especially suitable. This corresponds to an average molecular weight $M_w$ (weight average) ranging from 10,000 to 200,000, preferably from 20,000 to 80,000.

The diphenols are known per se or can be prepared by known processes.

Polycarbonates can be prepared, for example, by reacting the diphenols with phosgene in the interfacial process or with phosgene in the homogeneous phase process (the so-called pyridine process), wherein the molecular weight to be set is achieved in a well known manner by means of an appropriate amount of known chain terminators. (With respect to polydiorganosiloxane-containing polycarbonates see, for example, the DE-OS 33 34 782). Examples of suitable chain terminators are phenol, p-t-butylphenol, but also long-chained alkylphenols, like 4-(1,3-tetramethyl-butyl)-phenol, according to the DE-OS 28 42 005, or monoalkylphenols or dialkylphenols having a total of 8 to 20 carbon atoms in the alkyl substituents, according to the DE-A 35 06 472, like p-nonylphenol, 3,5-di-t-butylphenol, p-t-octylphenol, p-dodecylphenol, 2-(3,5-dimethylheptyl-)-phenol and 4-(3,5-dimethylheptyl)-phenol.

For the purpose of the present invention, halogen-free polycarbonates are the polycarbonates that are synthesized from halogen-free diphenols, halogen-free chain terminators and optionally halogen-free branchers. In this case the content of subordinate ppm amounts of saponifiable chlorine, resulting, for example, from the preparation of polycarbonates with phosgene in the interfacial process, must not be regarded as halogen-containing for the purpose of the invention. Such polycarbonates with ppm content of saponifiable chlorine are halogen-free polycarbonates for the purpose of the present invention.

Other suitable components a), which must be mentioned, are amorphous polyester carbonates. In this case the carbonate units were replaced to some extent with aromatic dicarboxylic acid ester units, based on isophthalic acid and/or terephthalic acid. For more details reference is made at this point to the EP-A 711 810.

Other suitable copolycarbonates with cycloalkyl groups as the monomer units are described in the EP-A 365 916.

Furthermore, bisphenol A can be replaced with 1,1-bis(4-hydroxyphenyl-3,3,5-trimethylcyclohexane (bisphenol TMC). Such polycarbonates are commercially available under the tradename APEC HT® from the Bayer company.

Yet another especially preferred group of polymers a) comprises (meth)acrylate, in particular PMMA and PMMA-based copolymers.

Polymethyl methacrylates are generally obtained by radical polymerization of mixtures, which contain methyl methacrylate. In general, these mixtures contain at least 40% by wt., preferably at least 60% by wt., and particularly preferably at least 80% by wt., based on the weight of the monomer-methyl methacrylate.

In addition, these mixtures for preparing polymethyl methacrylates can contain other (meth)acrylates, which can be copolymerized with methyl methacrylate. The term (meth)acrylates covers methacrylates and acrylates as well as mixtures of the two. Furthermore, these monomers are widely known. They include, inter alia, (meth)acrylates, which are derived from saturated alcohols, such as methyl(meth)acrylate, ethyl (meth)acrylate, propyl (meth)acrylate, n-butyl (meth)acrylate, tert.-butyl (meth)acrylate, pentyl (meth)acrylate and 2-ethylhexyl (meth)acrylate; (meth)acrylates, which are derived from unsaturated alcohols, such as oleyl (meth)acrylate, 2-propinyl (meth)acrylate, allyl (meth)acrylate, vinyl (meth)acrylate; aryl (meth)acrylates, like benzyl (meth)acrylate or phenyl (meth)acrylate, in which case the aryl groups can be unsubstituted or can be substituted up to four times; cycloalkyl (meth)acrylate, like 3-vinyl-cyclohexyl (meth)acrylate, bornyl (meth)acrylate; hydroxylalkyl (meth)acrylates, like 3-hydroxypropyl (meth)acrylate, 3,4-dihydroxybutyl (meth)acrylate, 2-hydroxyethyl (meth)acrylate, 2-hydroxypropyl)meth)acrylate; glycol di(meth)acrylates, like 1,4-butanediol (meth)acrylate, (meth)acrylates of ether alcohols, like tetrahydrofurfuryl (meth)acrylate, vinyloxy ethoxyethyl (meth)acrylate; amides and nitriles of (meth)acrylic acid, like N-(3-dimethyl aminopropyl) (meth)acrylamide, N-(diethylphosphono)(meth)acrylamide, 1-methacryloylamido-2-methyl-2-propanol; sulfur-containing methacrylates, like ethyl sulfinyl ethyl (meth)acrylate, 4-thiocyanatobutyl (meth)acrylate, ethyl sulfonyl ethyl (meth)acrylate, thiocyanatomethyl (meth)acrylate, methyl sulfinyl methyl (meth)acrylate, bis((meth)acryloyloxyethyl)sulfide, multi-valent (meth)acrylates, like trimethylol-propane tri (meth)acrylate.

In addition to the (meth)acrylates, presented above, the compositions that are to be polymerized can also exhibit other unsaturated monomers, which can be copolymerized with methyl methacrylate and the aforementioned (meth)acrylates.

They include, inter alia, 1-alkenes, like hexene-1, heptene-1; branched alkenes, such as vinyl cyclohexane, 3,3-dimethyl-1-propene, 3-methyl-1-diisobutylene, 4-methylpentene-1; acrylonitrile; vinyl esters, like vinyl acetate; styrene, substituted styrenes with an alkyl substituent in the side chain, such as alpha-methyl styrene and alpha-ethyl styrene, substituted styrenes with an alkyl substituent in the ring, like vinyl toluene and p-methyl styrene, halogenated styrenes, such as monochlorostyrenes, dichlorostyrenes, tribromostyrenes and tetrabromostyrenes; heterocyclic vinyl compounds, like 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinyl piperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxalan, vinylfuran, vinylthiophene, vinylthiolane, vinylthiazoles and hydrated vinylthiazoles, vinyloxazoles and hydrated vinyloxazoles; vinyl- and isoprenyl ethers; maleic acid derivatives, such as maleic acid anhydride, methylmaleic acid anhydride, maleimide, methylmaleimide; in addition, dienes, such as divinyl benzene.

In general, these comonomers will be used in an amount ranging from 0 to 60% by wt., preferably 0 to 40% by wt., and particularly preferably 0 to 20% by wt., based on the weight of the monomers, and the compounds can be used individually or as a mixture.

The polymerization is generally started using known radical initiators. The preferred initiators include, inter alia, the azo initiators, which are widely known in professional circles, such as AIBN and 1,1-azobiscyclohexane carbonitrile, as well as peroxy compounds, like methyl ethyl ketone peroxide, acetylacetone peroxide, dilauryl peroxide, tert.-butyl per-2-ethylhexanoate, ketone peroxide, methylisobutyl ketone peroxide, cyclohexanone peroxide, dibenzoyl peroxide, tert.-butyl peroxybenzoate, tert.-butyl peroxyisopropyl carbonate, 2,5-bis(2-ethylhexanoylperoxy)-2,5-dimethylhexane, tert.-butylperoxy-2-ethyl-hexanoate, tert.-butylperoxy-3,5,5-trimethyl-hexanoate, dicumyl peroxide, 1,1-bis(tert.-butyl-peroxy)cyclohexane, 1,1-bis(tert.-butylperoxy)3,3,5-trimethylcyclohexane, cumylhydroperoxide, tert.-butyl hydroperoxide, bis(4-tert.-butylcyclohexyl) peroxydicarbonate, mixtures of two or more of the aforementioned compounds with one another, as well as mixtures of the aforementioned compounds with unnamed compounds, which can also form radicals. (Cf. in this regard, for example, H. Rauch-Puntigam, Th. Völker, Acryl- and Methacryl Compounds, Springer, Heidelberg, 1967 or Kirk-Othmer, Encyclopedia of Chemical Technology, vol. 1, pages 286 ff., John Wiley & Sons, New York, 1978).

The polymerization initiators are used preferably in amounts ranging from $10^{-4}$ to 0.1% by wt., based on the starting materials, especially preferably in amounts ranging from $2 \times 10^{-4}$ to 0.05% by wt., and particularly preferably in amounts ranging from $10^{-3}$ to 0.02% by wt.

The molecular weight regulators or chain transfer regulators that are used are also usual compounds, particularly mercaptans of the R—SH type, where R can stand for an optionally cyclic or branched alkyl group having 2 to 20 carbon atoms, like n-butyl mercaptan, tert.-dodecyl mercaptan, esters of thioglycolic acid or also polyfunctional mercaptans having 2 to 6 SH groups, preferably in amounts ranging from 0.5 to 5% by wt., based on the starting substances (cf. in this regard, also H. Rauch-Puntigam, Th. Völker, Acryl- and Methacryl Compounds, Springer, Heidelberg, 1967). Amounts of molecular weight regulators ranging from 0.1 to 2% by wt. are especially preferred; amounts ranging from 0.2 to 1% by wt. are very especially preferred.

Furthermore, halogen-containing compounds, such as $CCl_4$ or benzyl bromide, can be used for controlling the molecular weight. However, regulators of the R—SH or R'—H type are preferred, where R' can stand for alkyl, cycloalkyl or aralkyl having 5 to 30 carbon atoms, such as cumol, which are able to terminate the growing polymer chain with an H atom.

The (meth)acrylate (co)polymers exhibit preferably a solution viscosity in chloroform at 25 deg. C. (ISO 1628—Part 6) ranging from 45 to 80, preferably 50 to 75 ml/g. This can correspond to a molecular weight $M_w$ (weight average) in a range from 80,000 to 200,000 (g/mol), preferably from 100,000 to 170,000. The molecular weights $M_w$ can be determined, for example, by gel permeation chromatography or by scatter light methods (see, for example, H. F. Mark et al., Encyclopedia of Polymer Science and Engineering, 2nd. edition, vol. 10, pages 1 ff., J. Wiley, 1989).

The (meth)acrylate (co)polymer molding compounds can contain customary additives of all types. They include, inter alia, antistatics, antioxidants, mold release agents, flameproofing agents, lubricants, colorants, flow enhancers, other fillers, light stabilizers and ultraviolet light absorbers and organic phosphorous compounds, such as phosphites and phosphonates, pigments, anti-weathering agents and plasticizers. However, the amount of additives is restricted by the purpose of the application.

Another group of polymers a) comprises vinyl aromatic polymers.

They include, inter alia, vinyl aromatic polymers made from styrene, chlorostyrene, alpha-methylstyrene and p-methylstyrene; in subordinate proportions (preferably no more than 20, in particular no more than 8% by wt., comonomers, like (meth)acrylonitrile or (meth)acrylate can also be involved in the synthesis. Especially preferred vinyl aromatic polymers are polystyrene and impact resistant-modified polystyrene. It is clear that even mixtures of these polymers can be employed. The preparation takes place preferably according to the process, described in the EP-A-302 485.

The so-called ASA, SAN and/or ABS plastics are especially practical.

Preferred ASA polymerizates are synthesized from a soft or rubber phase made from a graft polymer of:

$A_1$ 50 to 90% by wt. of a graft base, based on $A_{11}$ 95 to 99.9% by wt. of a $C_2$-$C_{10}$ alkylacrylate and $A_{12}$ 0.1 to 5% by wt. of a difunctional monomer having two olefinic, non-conjugated double bonds, and $A_2$ 10 to 50% by wt. of a graft made from $A_{21}$ 20 to 90% by wt., preferably 20 to 50% by wt., of styrene or substituted styrenes of the general formula I or mixtures thereof, and $A_{22}$ 10 to 80% by wt. of acrylonitrile, methacrylonitrile, acrylates or methacrylates or mixtures thereof, in a mixture with a hard matrix, based on a SAN copolymer $A_3$) made from $A_{31}$ 50 to 90, preferably 55 to 90 and particularly 65 to 85% by wt. of styrene and/or substituted styrenes of the general formula I and $A_{32}$ 10 to 50, preferably 10 to 45 and particularly 15 to 35% by wt. of acrylonitrile and/or methacrylonitrile.

Some preferred graft polymerizates are listed below:

1)

60% by wt. of a graft base $A_1$ made from $A_{11}$ 98% by wt. of n-butyl acrylate and $A_{12}$ 2% by wt. of dihydrodicyclopentadienyl acrylate and 40% by wt. of a graft shell $A_2$ made from $A_{21}$ 75% by wt. of styrene and $A_{22}$ 25% by wt. of acrylonitrile

2)

Graft base, as in 1), with 5% by wt. of a first graft step made from styrene and 35% by wt. of a second graft step made from $A_{21}$ 75% by wt. of styrene and $A_{22}$ 25% by wt. of acrylonitrile

3)

graft base, as in 1) with 13% by wt. of a first graft step made from styrene and 27% by wt. of a second graft step made from styrene and acrylonitrile in a weight ratio of 3:1.

ABS polymers as polymer a) in the inventive polymer compositions exhibit the same structure as described above for ASA polymers. Instead of the acrylate rubber $A_1$) of the graft base in the ASA polymer, rubbers, based on the ASA polymer, are usually employed so that the result is preferably the following composition for the graft base $A_4$:

$A_{41}$ 70 to 100% by wt. of a rubber, based on a conjugated diene, and $A_{42}$ 0 to 30% by wt. of a difunctional monomer having two olefinic non-conjugated double bonds.

Especially preferred compositions of the molding compounds of the invention contain as the component A) a mixture comprising:
- 10 to 90% by wt. of a polybutylene terephthalate
- 0 to 40% by wt. of a polyethylene terephthalate
- 1 to 40% by wt. of an ASA or ABS polymer or mixtures of these.

Other preferred compositions of the component a) contain
- 10 to 90% by wt. of a polycarbonate
- 0 to 40% by wt. of a polyester, preferably polybutylene terephthalate,
- 1 to 40% by wt. of an ASA or ABS polymer or mixtures of these.

Other suitable polymers, which can be mentioned, for the component a) are polyphenylene ether, polyolefins, like polyethylene and/or polypropylene mono- or copolymerizates—as well as polyketones, polyarylene ethers (so-called HT thermoplastics), in particular polyether sulfones, polyether ketones, polysulfone, polyphenylene sulfones, polyvinyl chlorides, polyimides, PVDF, ETFE, EFEP as well as mixtures (blends) comprising at least two of the aforementioned polymers.

Preferred polymers also comprise polyolefins, such as PE, PP, polycyclopentenes, cycloolefin copolymers, based on norbornenes, EPM and EPDM rubbers and mixtures thereof.

Furthermore, the following polymers as constituent a) can be of special interest: SEBS, SES, natural rubber, polyisoprene, polybutadiene, nitrile rubber (also hydrogenated, or functionalized with carboxyl groups) or also polymers based on functional monomers, like vinylically polymerizable monomers with functional groups, like carboxylic acids,-amides, -chlorides, anhydrides, phosphates, phosphonates, sulfates and sulfonates. At least in the latter four substance classes, at least one acid proton must be present.

The Optional Constituents c)

Based on 100 parts by weight of a) and b), the compositions of the invention can comprise, as desired, up to 100 parts by weight of other additives, which are different from the compounds, cited under a) and b).

The additives, which can be used successfully as component c), include, on the one hand, conventional processing aids, but, on the other hand, also other fibrous and particulate fillers.

The conventional processing aids include, inter alia, substances, like stabilizers, oxidation retarders, agents to counter thermal decomposition and decomposition by ultraviolet light, lubricants, mold release agents, colorants, like dyes and pigments, nucleating agents, plasticizers, and the like.

Examples of oxidation retarders and heat stabilizers are sterically hindered phenols and/or phosphites, hydroquinones, aromatic secondary amines, like diphenylamines, various substituted representatives of these groups and mixtures of these in amounts of up to 2 parts by weight, based on 100 parts by weight of a)+b). UV stabilizers, which should be mentioned and are usually used in amounts of up to 4 parts by weight, based on 100 parts by weight of a)+b), are various substituted resorcinols, salicylates, benzotriazoles and benzophenones. Other inorganic pigments, like titanium oxide, ultramarine blue, iron oxide and carbon black, furthermore, organic pigments, like phthalocyanines, quinacridones, perylenes, as well as dyes, like nigrosine and anthraquinones, can also be added as colorants. Nucleating agents, which can be used, inter alia, are sodium phenylphosphinate, aluminum oxide, silicon dioxide, as well as preferably talc. Lubricants and mold release agents are usually used in amounts of up to 2 parts by weight; they are preferably long chain fatty acids (for example, stearic acid or behenic acid), salts of these (for example, Ca stearate or Zn stearate) or montan waxes (mixtures of straight chain, saturated carboxylic acids with chain lengths ranging from 28 to 32 carbon atoms) as well as Ca montanate or Na montanate as well as low molecular polyethylene waxes and/or low molecular polypropylene waxes.

Examples of plasticizers, which should be mentioned, are dioctyl phthalates, dibenzyl phthalates, butyl benzyl phthalates, hydrocarbon oils, N-(n-butyl)benzenesulfonamide. Other plasticizers are esters of p-hydroxybenzoic acid (for example, 2-ethyl hexyl ester). The inventive compositions can also comprise up to 4 parts by weight of fluorine-containing ethylene polymerizates, based on 100 parts of a)+b). These are polymerizates of ethylene with a fluorine content ranging from 55 to 76% by wt., preferably 70 to 76% by wt.

Examples of these are polytetrafluoroethylene (PTFE), tetrafluoroethylene-hexafluoropropylene copolymers or tetrafluoroethylene copolymerizates with smaller proportions (usually up to 50% by wt.) of copolymerizable ethylenically unsaturated monomers. They are described, for example, by Schildknecht in "Vinyl and Related Polymers", Wiley Verlag, 1952, pages 484 to 494 and by Wall in "Fluoropolymers" (Wiley Interscience, 1972).

These fluorine-containing ethylene polymerizates have a homogeneous distribution in the molding compounds and exhibit preferably a particle size $d_{50}$ (number average) in a range of 0.05 to 10 μm, in particular from 0.1 to 5 μm. These small particle sizes can be achieved, in particular, preferably by using aqueous dispersions of fluorine-containing ethylene polymerizates and by incorporating them into the melt, for example, a polyester melt.

In addition, a practical further development of the inventive compositions can also exhibit certain low molecular esters and/or amides, certain polymeric impact resistant modifiers and/or certain fibrous and/or particulate fillers c), which are different from the substances, listed under a) and b).

The inventive components can comprise, as component c), as desired, up to 10, preferably 0.1 to 6, and particularly 0.2 to 4 parts (w/w) of at least one ester or amide of saturated or unsaturated aliphatic carboxylic acids having 10 to 40, preferably 16 to 22 carbon atoms with aliphatic saturated alcohols or amines having 2 to 40, preferably 2 to 6 carbon atoms. The carboxylic acids can have valence states of 1 or 2. Examples, which can be mentioned, are pelargonic acid, palmitic acid, lauric acid, margaric acid, dodecanedoic acid, behenic acid and, in particular, preferably stearic acid, capric acid and montanic acid (a mixture of fatty acids having from 30 to 40 carbon atoms). The aliphatic alcohols can have a valence state of 1 to 4. Examples of alcohols are n-butanol, n-octanol, stearyl alcohol, ethylene glycol, propylene glycol, neopentyl glycol, pentaerythritol, glycerol and pentaerythritol being preferred. The aliphatic amines can have a valence state of 1 to 3. Examples of these are stearylamine, ethylenediamine, propylenediamine, hexamethylenediamine, di(6-aminohexyl)amine, ethylenediamine and hexamethylene-diamine being especially preferred. Correspondingly, preferred esters or amides are glycerol distearate, glycerol tristearate, ethylenediamine distearate, glycerol monopalmitate, glycerol trilaurate, glycerol monobehenate and pentaerythritol tetrastearate. Mixtures of different esters or amides or combinations of esters with amides can also be used, in which case the mixing ratio can be as desired.

Examples of other conventional additives c) are amounts of up to 80, preferably up to 60 parts by weight, based on 100 parts (w/w) of a)+b), of elastomeric polymerizates (often also referred to as impact strength modifiers, elastomers or rubber).

They are very generally copolymers, which have preferably been synthesized from at least two of the following monomers: ethylene, propylene, butadiene, isobutene, isoprene, chloroprene, vinyl acetate, styrene, acrylonitrile and acrylates and/or methacrylates having from 1 to 18 carbon atoms in the alcohol component. Such polymers are described, for example, in Houben-Weyl, Methods of Organic Chemistry, Vol. 14/1 (Georg-Thieme-Verlag, Stuttgart, 1961), pages 392-406, and in the monograph by C. B. Bucknall, "Toughened Plastics" (Applied Science Publishers, London, 1977).

Preferred types of such elastomers are the so-called ethylene-propylene (EPM) and/or ethylene-propylene-diene (EPDM) rubbers. EPM rubbers generally have practically no residual double bonds, whereas EPDM rubbers can have from 1 to 20 double bonds per 100 carbon atoms.

Examples, which can be mentioned of diene monomers for EPDM rubbers, are conjugated dienes, such as isoprene and butadiene, non-conjugated dienes having from 5 to 25 carbon atoms, such as penta-1,4-diene, hexa-1,4-diene, hexa-1,5-diene, 2,5-dimethyl-hexa-1,5-diene and octa-1,4-diene, cyclic dienes, such as cyclopentadiene, cyclohexadienes, cyclooctadienes and dicyclopentadiene, as well as alkenyl-norbornenes, such as 5-ethylidene-2-norbornene, 5-butyl-idene-2-norbornene, 2-methallyl-5-norbornene, 2-isoprope-nyl-5-norbornene, and tricyclodienes, such as 3-methyltricyclo(5.2.1.0.2.6)-3,8-decadiene, or mixtures of these. Preference is given to hexa-1,5-diene, 5-ethylidene-norbornene and dicyclopentadiene. The diene content of the EPDM rubbers ranges preferably from 0.5 to 50, in particular from 1 to 8% by weight, based on the total weight of the rubber.

EPM and/or EPDM rubbers can also be preferably grafted with reactive carboxylic acids or with their derivatives. Examples of these are acrylic acid, methacrylic acid and their derivatives, for example, glycidyl (meth)acrylate as well as maleic anhydride.

Another group of preferred rubbers are copolymers of ethylene with acrylic acid and/or methacrylic acid and/or with the esters of these acids. In addition, the rubbers can also include dicarboxylic acids, such as maleic acid and fumaric acid, or derivatives of these acids, for example, esters and anhydrides, and/or monomers containing epoxy groups. Preferably compounds, like maleic acid, fumaric acid, maleic acid anhydride, allyl glycidyl ether and vinyl glycidyl ether, are incorporated. The copolymers are advantageously composed of from 50 to 98% by weight of ethylene, from 0.1 to 20% by weight of monomers, containing epoxy groups, and/or methacrylic acid and/or monomers, containing acid anhydride groups, as well as the residual amount of (meth)acrylates. Particular preference is given to copolymers comprising from 50 to 98, in particular from 55 to 95% by weight, of ethylene, from 0.1 to 40, in particular from 0.3 to 20% by weight, of glycidyl acrylate and/or glycidyl methacrylate, (meth)acrylic acid and/or maleic acid anhydride, and from 1 to 45, in particular from 10 to 40% by weight, of n-butyl acrylate and/or 2-ethylhexyl acrylate. Other preferred esters of acrylic acid and/or methacrylic acid are the methyl, ethyl, propyl, i- and/or t-butyl esters. Besides these, vinyl esters and vinyl ethers can also be used as the comonomers.

The ethylene copolymers, described above, can be prepared by processes that are known per se, preferably by random copolymerization at high pressure and raised temperature. Appropriate processes are well known.

Preferred elastomers also include emulsion polymerizates, the preparation of which is described, for example, by Blackley in the monograph "Emulsion Polymerization".

The emulsifiers and catalysts, which can be used, are known per se.

In principle, homogeneously structured elastomers or those with a shell structure can be used. The shell-like structure is determined by the sequence of addition of the individual monomers; the morphology of the polymers is also affected by this sequence of addition. Monomers, which can be mentioned here, merely as examples, for the preparation of the rubber fraction of the elastomers are acrylates, such as n-butyl acrylate and 2-ethylhexyl acrylate, corresponding methacrylates, butadiene and isoprene, and also mixtures of these. These monomers can be copolymerized with other monomers, such as styrene, acrylonitrile, vinyl ethers and other acrylates or methacrylates, such as methyl methacrylate, methyl acrylate, ethyl acrylate or propyl acrylate. The soft or rubber phase (with a glass transition temperature below 0 deg. C.) of the elastomers can be the core, the outer envelope or an intermediate shell (in the case of elastomers whose structure has more than two shells). Elastomers having more than one shell can also have a plurality of shells made from a rubber phase. If one or more hard components (with glass transition temperatures above 20 deg C. are involved, besides the rubber phase, in the synthesis of the elastomer, these are generally prepared by polymerizing, as the principal monomers, styrene, acrylonitrile, methacrylonitrile, α-methylstyrene, p-methylstyrene, or acrylates and methacrylates, such as methyl acrylate, ethyl acrylate and methyl methacrylate. Besides these, it is also possible to use smaller proportions of other comonomers.

In some cases it has proven advantageous to use emulsion polymerizates, which have reactive groups on their surfaces. Examples of such groups are epoxy, carboxyl, latent carboxyl, amino or amide groups as well as functional groups which can be introduced by concomitant use of appropriate monomers. The graft monomers, described in the EP-A 208 187, are also suitable for introducing reactive groups at the surface.

Other examples, which can be mentioned, are acrylamide, methacrylamide and substituted esters of acrylic acid or methacrylic acid, such as (N-t-butylamino)-ethyl methacrylate, (N,N-dimethylamino)ethyl acrylate, (N,N-dimethylamino)methyl acrylate and (N,N-diethylamino)ethyl acrylate.

Furthermore, the particles of the rubber phase can also be crosslinked. Examples of crosslinking monomers are buta-1,3-diene, divinylbenzene, diallyl phthalate and dihydrodicyclopentadienyl acrylate, as well as the compounds, described in the EP-A 50 265.

Furthermore, it is also possible to use the so-called graft-linking monomers (graft linking monomers), i.e. monomers having two or more polymerizable double bonds, which react at different rates during the polymerization. Preference is given to the use of such compounds, in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber.

If then another phase is grafted onto such a rubber, the double bonds in the rubber react at least to some extent with the graft monomers to form chemical bonds. That is, the grafted-on phase is linked at least to some degree via chemical bonding to the graft base. Examples of such graft-linking monomers are monomers that contain allyl groups, in particular allyl esters of ethylenically unsaturated carboxylic acids, like allyl acrylate, allyl methacrylate, diallyl maleate, diallyl fumarate and diallyl itaconate, or the corresponding monoallyl compounds of these dicarboxylic acids. Besides these, there is a plurality of other suitable graft-linking monomers. For more details, reference is made here, for example, to the U.S. Pat. No. 4,148,846. In general, the proportion of these crosslinking monomers in the impact strength-modifying polymer is up to 5% by weight, preferably not more than 3% by weight, based on the impact strength-modifying polymer.

Instead of graft polymerizates having a multi-shell structure, homogeneous, i.e. single-shell, elastomers made from buta-1,3-diene, isoprene and n-butyl acrylate or from their copolymers can also be used. These products, too, can be prepared by concomitant use of crosslinking monomers or monomers having reactive groups.

Examples of preferred emulsion polymerizates are n-butyl acrylate/(meth)acrylic acid copolymers, n-butyl acrylate/glycidyl acrylate or n-butyl acrylate/glycidyl methacrylate copolymers, graft polymerizates with an inner core made from n-butyl acrylate or based on butadiene and with an outer envelope made from the aforementioned copolymers, and copolymers of ethylene with comonomers, which supply reactive groups.

The described elastomers can also be prepared by other conventional processes, for example, by suspension polymerization.

Silicone rubbers, as described in the DE-A 37 25 576, EP-A 235 690, DE-A 38 00 603 and EP-A 319 290, are also preferred.

Of course, mixtures of the types of rubber that are listed above can also be used.

Examples of fibrous or particulate fillers c) are carbon fibers, glass fibers, glass beads, amorphous silica, asbestos, calcium silicate, calcium metasilicate, magnesium carbonate, kaolin, chalk, quartz powder, mica, barium sulfate and feldspar, which are used in amounts of up to 100 parts (w/w), in particular up to 80 parts (w/w). Examples of preferred fibrous fillers are carbon fibers, aramide fibers and potassium titanate fibers, in which case the glass fibers, as E glass, are particularly preferred. They can be used as rovings or as chopped glass in the forms that are commercially available.

The fibrous fillers can be pretreated on their surfaces with a silane compound, for better compatibility with the inventive composition. Preferred silane compounds for this purpose are, inter alia, aminopropyltrimethoxysilane, aminobutyltrimethoxysilane, aminopropyltriethoxysilane, aminobutyltriethoxysilane and the corresponding silanes, which contain a glycidyl group as the substituent x.

In general, the silane compounds are used for surface coating in amounts of from 0.05 to 5, preferably from 0.5 to 1.5 and, in particular, from 0.8 to 1% by weight (based on c).

Acicular mineral fillers are also suitable. For the purposes of the invention, acicular mineral fillers are mineral fillers of strongly developed acicular character. An example is acicular wollastonite. The mineral exhibits preferably an L/D (length to diameter or aspects) ratio ranging from 8:1 to 35:1, preferably from 8:1 to 11:1. The mineral filler can, if desired, be pretreated with the aforementioned silane compounds, but the pretreatment is not absolutely necessary.

Other fillers, which can be mentioned, are kaolin, calcined kaolin, wollastonite, talc, and chalk as well as additionally lamellar or acicular fillers, preferably having a size in the nano range, preferably in amounts ranging from 0.2 to 20 parts (w/w), based on 100 parts of a)+b). Preferably boehmite, bentonite, montmorillonite, vermiculite, hectorite and laponite are used for this purpose. In order to obtain a good compatibility of the lamellar nanofillers with the polymer (organic binder), the lamellar nanofillers are organically modified according to the prior art. The addition of the lamellar or acicular nanofillers to the compositions of the invention can lead to a further increase in the mechanical strength.

The invention relates to a process for preparing a composition, which is described above and in which the particles b) and optionally the additives c) are mixed with the polymer a).

In so doing, the procedure can vary widely.

Preference can be given to the use of inorganic particles without modification of the surface. It can also be practical under some circumstances to use the particles with modified surface after previously carrying out a modification step.

Furthermore, the particles can be isolated, but the particles can also be used as a dispersion of the particles without previous isolation.

In a variant of the process of the invention, it is preferred that i) agglomerated particles b), which are organically modified, as desired, on the surface, are dispersed in an organic solvent under shearing conditions, and ii) then the obtained dispersion is mixed with the organic polymer a) as well as optionally the additives c).

A preferred further development of this process is carried out in such a manner that in step i) a predispersion is first prepared, which is conveyed then through a high energy mixer at a pressure of more than 2,000 bar and that, thereafter, the dispersion, which is obtained by milling at a high energy input, is stabilized with an organic acid.

Of special interest in this context are processes, which are characterized in that in step ii) a solution comprising polymer a), particles b) and optionally additives c) is prepared by applying raised temperature, and then the composition settles out by lowering the temperature.

Hence, a composition made of polymer a), inorganic particles b) and optionally additives c) is obtained by reprecipitation from a solution.

An alternative and preferred variant of the process provides that in step ii) polymer a), particles b) and optionally additives c) are mixed in an extruder. This permits dispensing with the reprecipitation.

A preferred variant of the process includes that surface modified particles are used. It is advised to use phosphates, phosphonates and sulfonates for this purpose.

The inventive compositions can also be obtained preferably by organically modifying the surface of the agglomerated particles with a siloxane, chlorosilane, silazane, titanate or zirconate in an organic solvent and then mixing with a polymer a).

It can be particularly important to achieve a partial coating of the particle surface during the surface modification of the particles, a feature that can be achieved in connection with the use of simultaneously a mineral acid and an organic, modified acid.

In this case it can be advantageous for the component b) to be added, as a powder, to the thermoplastic a) in the form of a dispersion with the organic solvent or by removal of the solvent.

Furthermore, it has proven to be advantageous to add the powder or the dispersion to the monomers, forming the thermoplastic a), and then to carry out the polymerization in the presence of b), as well as to carry out the surface modification of b) in the polymer melt a) under sheer loading, for example, in an extruder.

The inventive compositions can be prepared by processes that are known per se, by mixing the starting components in conventional mixing devices, like screw-extruders, Brabender mixers or Banbury mixers, and then extruding them. After extrusion, the extrudate can be cooled and comminuted. It is also possible to premix individual components and then to add the remaining starting materials, individually and/or also mixed. The mixing temperatures usually range from 50 to 450 deg. C. Preference is given to 100 to 350 deg. C.; particular preference is given to 230 deg to 290 deg. C.

According to another preferred method of operation, the components b) and optionally c) can be mixed with a prepolymer, compounded and pelletized.

The pellets that are obtained are then subjected in a solid phase to continuous or batch condensation under inert gas at a temperate below the melting point of component a), until the desired viscosity is reached.

The inventive compositions are suitable for producing fibers, films and shaped articles of any type, in particular for applications in the injection molding process of components, such as application in the electrical sector, like laced wiring harnesses, laced wiring harness elements, hinges, connectors, connector parts, pin and socket connectors, circuit boards, electrical connecting elements, mechano-electronic components, optoelectronic components, in particular application in the automobile sector and under the engine hood.

The invention is explained in detail below with reference to tests and optionally comparison tests.

I Feed Materials:

A) Particle Suspensions

Suspension 1 (S1):

77 liters of ethanol were placed in a 100 liter stainless steel batch container. Then 23 kg of AEROXIDE® Alu C (BET 100 m$^2$/g), Degussa Co., were added to the batch container with the aid of the running Ystral Conti-TDS 3 (stator slits: 4 mm crown and 1 mm crown, rotor/stator spacing approximately 1 mm) under shear conditions. Following completion of the addition, post shearing was continued at 3,000 rpm for 30 minutes.

This predispersion was passed in two passages through the high energy Sugino Ultimaizer HJP-25050 mill at a pressure of 2,500 bar and diamond nozzles of 0.25 mm diameter and thus intensively further milled.

In order to stabilize, 85% strength phosphoric acid was added to the resulting dispersion with intensive mixing, so that a concentration of 2% pure $H_3PO_4$, based on the $Al_2O$, was achieved.

After dispersing, an average particle size $d_{50}$ of 0.18 Sun was determined by dynamic light scattering (using a Zetasizer 3000 Hsa of the company Malvern Instruments, UK). The volume-weighted median value from the peak analysis is stated.

Suspension 2 (S2):

44 liters of ethanol and 1.00 kg of $H_3PO_4$ (85% strength) were placed in a 100 liter stainless steel batch container. Then 21 kg of AEROXIDE® Alu C (BET 100 m$^2$/g), Degussa Co., were added to the batch container with the aid of the running Ystral Conti-TDS 3 (stator slits: 4 mm crown and 1 mm crown, rotor/stator spacing approximately 1 mm) under shear conditions. Following the addition of approximately 18 kg of AEROXIDE® Alu C, an additional 0.13 kg of $H_3PO_4$ (85% strength) were added in order to achieve again a low viscosity. After completion of the addition, post shearing was continued at 3,000 rpm for 30 minutes. At 25 minutes of shear time, an additional 1.2 kg of $H_3PO_4$ (85% strength) were added so that a concentration of 11% $H_3PO_4$ (85% strength), based on the $Al_2O_3$, was achieved.

This predispersion was passed in two passages through the high energy Sugino Ultimaizer HJP-25050 mill at a pressure of 2,500 bar and diamond nozzles of 0.25 mm diameter and thus intensively further milled.

After dispersing, a particle size $d_{50}$ of 0.14 μm was determined by dynamic light scattering (using a Zetasizer 3000 Hsa of the company Malvern Instruments, UK). The volume-weighted median value from the peak analysis is stated.

Suspension 3 (S3):

77 liters of ethanol were placed in a 100 liter stainless steel batch container. Then 23 kg of AEROXIDE® Alu C (BET 100 m$^2$/g), Degussa Co., were added to the batch container with the aid of the running Ystral Conti-TDS 3 (stator slits: 4 mm crown and 1 mm crown, rotor/stator spacing approximately 1 mm) under shear conditions. After completion of the addition, post shearing was continued at 3,000 rpm for 30 minutes.

This predispersion was passed in two passages through the high energy Sugino Ultimaizer HJP-25050 mill at a pressure of 2,500 bar and diamond nozzles of 0.25 mm diameter and thus intensively further milled.

In order to stabilize, 85% strength phosphoric acid was added now to the resulting dispersion with intensive mixing, so that a concentration of 2% pure $H_3PO_4$, based on the $Al_2O_3$ amount, was achieved. Then Cublen P 50 (a commercial product of Schwarz and Zschimmer GmbH, a 50% strength solution of 2-phosphonobutane-1,2,4-tricarboxylic acid in water) was added, so that a concentration of 1% Cublen P 50, based on the $Al_2O_3$ amount, was achieved.

After dispersing, a particle size $d_{50}$ of 0.13 μm was determined by static light scattering (Zetasizer 3000 Hsa of the company Malvern Instruments, UK). The volume-weighted median value from the peak analysis is stated.

Suspension 4 (S4):

77 liters of ethanol were placed in a 100 liter stainless steel batch container. Then 23 kg of AEROXIDE® Alu C (BET 100 m$^2$/g), Degussa Co., were added to the batch container with the aid of the running Ystral Conti-TDS 3 (stator slits: 4 mm crown and 1 mm crown, rotor/stator spacing approximately 1 mm) under shear conditions. After completion of the addition, post shearing was continued at 3,000 rpm for 30 minutes.

This predispersion was passed in two passages through the high energy Sugino Ultimaizer HJP-25050 mill at a pressure of 2,500 bar and diamond nozzles of 0.25 mm diameter and thus intensively further milled.

In order to stabilize, 85% strength phosphoric acid was added now to the resulting dispersion with intensive mixing, so that a concentration of 4% pure $H_3PO_4$, based on the $Al_2O_3$ amount, was achieved. Then Cublen P 50 (a commercial product of Schwarz and Zschimmer GmbH, a 50% strength solution of 2-phosphonobutane-1,2,4-tricarboxylic acid in water) was added, so that a concentration of 1% Cublen P 50, based on the total dispersion, was achieved.

After dispersing, a particle size $d_{50}$ of 0.06 μm was determined by static light scattering (Zetasizer 3000 Hsa of the company Malvern Instruments, UK). The volume-weighted median value from the peak analysis is stated.

Suspension 5 (S5):

77 liters of ethanol were placed in a 100 liter stainless steel batch container. Then 23 kg of VP zirconium oxide PH, Degussa Co., were added to the batch container with the aid of the running Ystral Conti-TDS 3 (stator slits: 4 mm crown and 1 mm crown, rotor/stator spacing approximately 1 mm) under shear conditions. After completion of the addition, post shearing was continued at 3,000 rpm for 30 minutes.

This predispersion was passed in two passages through the high energy Sugino Ultimaizer HJP-25050 mill at a pressure of 2,500 bar and diamond nozzles of 0.25 mm diameter and thus intensively further milled.

In order to stabilize, 85% strength phosphoric acid was added now to the resulting dispersion with intensive mixing, so that a concentration of 2% pure $H_3PO_4$, based on the $ZrO_2$ amount, was achieved. Then Cublen P 50 (a commercial product of Schwarz and Zschimmer GmbH, a 50% strength solution of 2-phosphonobutane-1,2,4-tricarboxylic acid in water) was added, so that a concentration of 2% Cublen P 50, based on the total dispersion, was achieved.

After dispersing, a particle size $d_{50}$ of 0.08 µm was determined by static light scattering (Zetasizer 3000 Hsa of the company Malvern Instruments, UK). The volume-weighted median value from the peak analysis is stated.

Suspension 6 (S6):

80 liters of xylene were placed in a 100 liter stainless steel batch container. Then 20 kg of AEROXIDE® Alu C (BET 100 $m^2/g$), Degussa Co., were added to the batch container with the aid of the running Ystral Conti-TDS 3 (stator slits: 4 mm crown and 1 mm crown, rotor/stator spacing approximately 1 mm) under shear conditions. After completion of the addition, post shearing was continued at 3,000 rpm for 30 minutes.

This predispersion was passed in two passages through the high energy Sugino Ultimaizer HJP-25050 mill at a pressure of 2,500 bar and diamond nozzles of 0.25 mm diameter and thus intensively further milled.

In order to stabilize, 85% strength phosphoric acid was added now to the resulting dispersion with intensive mixing, so that a concentration of 2% pure $H_3PO_4$, based on the $Al_2O_3$ amount, was achieved. Then Hostaphat OPS (a commercial product of Clariant AG, n-octyl phosphonic acid) was added, so that a concentration of 4% Hostaphat OPS, based on the total dispersion, was achieved.

After dispersing, a particle size $d_{50}$ of 0.14 µm was determined by static light scattering (Zetasizer 3000 Hsa of the company Malvern Instruments, UK). The volume-weighted median value from the peak analysis is stated.

Suspension 7 (S7):

77 liters of ethanol were placed in a 100 liter stainless steel batch container. Then 23 kg of AEROXIDE® Alu C (BET 100 $m^2/g$), Degussa Co., were added to the batch container with the aid of the running Ystral Conti-TDS 3 (stator slits: 4 mm crown and 1 mm crown, rotor/stator spacing approximately 1 mm) under shear conditions. After completion of the addition, post shearing was continued at 3,000 rpm for 30 minutes.

This predispersion was passed in two passages through the high energy Sugino Ultimaizer HJP-25050 mill at a pressure of 2,500 bar and diamond nozzles of 0.25 mm diameter and thus intensively further milled.

In order to stabilize, 85% strength phosphoric acid was added now to the resulting dispersion with intensive mixing, so that a concentration of 2% pure $H_3PO_4$, based on the $Al_2O_3$ amount, was achieved. Then Cublen P 50 (a commercial product of Schwarz and Zschimmer GmbH, a 50% strength solution of 2-phosphonobutane-1,2,4-tricarboxylic acid in water) and TAMOL VS (vinyl sulfonate sodium salt, a commercial product of BASF AG, as 25% by wt. solution in water) were added, so that a concentration of 1% by wt., based on the total dispersion, was achieved.

After dispersing, a particle size $d_{50}$ of 0.08 µm was determined by static light scattering (Zetasizer 3000 Hsa of the company Malvern Instruments, UK). The volume-weighted median value from the peak analysis is stated.

Suspension 8 (S8):

77 liters of ethanol were placed in a 100 liter stainless steel batch container. Then 23 kg of VP zirconium oxide PH, Degussa Co., were added to the batch container with the aid of the running Ystral Conti-TDS 3 (stator slits: 4 mm crown and 1 mm crown, rotor/stator spacing approximately 1 mm) under shear conditions. After completion of the addition, post shearing was continued at 3,000 rpm for 30 minutes.

This predispersion was passed in two passages through the high energy Sugino Ultimaizer HJP-25050 mill at a pressure of 2,500 bar and diamond nozzles of 0.25 mm diameter and thus intensively further milled.

In order to stabilize, 85% strength phosphoric acid was added now to the resulting dispersion with intensive mixing, so that a concentration of 2% pure $H_3PO_4$, based on the $ZrO_2$ amount, was achieved.

Then Cublen P 50 (a commercial product of Schwarz and Zschimmer GmbH, a 50% strength solution of 2-phosphonobutane-1,2,4-tricarboxylic acid in water) was added, so that a concentration of 1% Cublen P 50, based on the $ZrO_2$ amount, was achieved.

After dispersing, a particle size $d_{50}$ of 0.08 µm was determined by static light scattering (Zetasizer 3000 Hsa of the company Malvern Instruments, UK). The volume-weighted median value from the peak analysis is stated.

Suspension 9 (S9):

77 liters of ethanol were placed in a 100 liter stainless steel batch container. Then 23 kg of AEROXIDE 200® (BET 200 $m^2/g$), Degussa Co., were added to the batch container with the aid of the running Ystral Conti-TDS 3 (stator slits: 4 mm crown and 1 mm crown, rotor/stator spacing approximately 1 mm) under shear conditions. After completion of the addition, post shearing was continued at 3,000 rpm for 30 minutes.

This predispersion was passed in two passages through the high energy Sugino Ultimaizer HJP-25050 mill at a pressure of 2,500 bar and diamond nozzles of 0.25 mm diameter and thus intensively further milled.

In order to stabilize, dynasilan GLYMO (a commercial product of Degussa AG) was added now to the resulting dispersion with intensive mixing, so that a concentration of 2% silane, based on the total dispersion, was achieved.

After dispersing, a particle size $d_{50}$ of 0.09 µm was determined by static light scattering (Zetasizer 3000 Hsa of the company Malvern Instruments, UK). The volume-weighted median value from the peak analysis is stated.

Suspension 10 (S10) for Comparison Tests:

Highlink NanO G 502-31 of the company Clariant GmbH Frankfurt was added. It is a 30 percent by weight suspension of spherical silicon dioxide particles having a fractality of approximately 3 in isopropanol. The particle size is given by the manufacturer at 0.013 µm. The viscosity is, according to manufacturer information, less than 50 mPs·s at 20 deg. C.

Suspension 11 (S11) for Comparison Tests:

Dynasilan GLYMO (a commercial product of Degussa AG) was added to suspension 10 with intensive mixing, so that a concentration of 2% silane, based on the total dispersion, was achieved.

After dispersing, a particle size $d_{50}$ of 0.024 µm was determined by static light scattering (Zetasizer 3000 Hsa of the company Malvern Instruments, UK). The volume-weighted median value from the peak analysis is stated.

Suspension 12 (S12) for Comparison Tests:

An ethanolic zirconium dioxide suspension (20% by wt. in ethanol, stabilized with 6% by wt. of 3,6,9-trioxadecanoic acid) of the company Bühler with the tradename Z-EOs was added. The particle size $d_{50}$ of 0.031 µm was determined by static light scattering (Zetasizer 3000 Hsa of the company Malvern Instruments, UK). The volume-weighted median value from the peak analysis is stated.

Suspension 13 (S13) for Comparison Tests:

85% strength phosphoric acid was added to the suspension 12 with intensive mixing, so that a concentration of 2% pure $H_3PO_4$, based on the $ZrO_2$ amount, was achieved. Then Cublen P 50 (a commercial product of Schwarz and Zschimmer GmbH, a 50% strength solution of 2-phosphonobutane-1,2,4-tricarboxylic acid in water) was added, so that a concentration of 2% Cublen P 50, based on the total dispersion, was achieved.

After dispersing, a particle size $d_{50}$ of 0.035 μm was determined by static light scattering (Zetasizer 3000 Hsa of the company Malvern Instruments, UK). The volume-weighted median value from the peak analysis is stated.

B) Polymers:

P1) Vestamid ZA4487 (PA12), a product of Degussa AG, with a relative solution viscosity of 1.6, an amino end group concentration of 65 mmol/kg and a carboxyl end group concentration of 64 mmol/kg;

P2) Vestamid L2101 (PA12), a product of Degussa AG, with a relative solution viscosity of 12.1, an amino end group concentration of 15 mmol/kg and a carboxyl end group concentration of 55 mmol/kg;

P3) Vestodur 3000 (PBT), a product of Degussa AG, with a J value of 165 ml/g and a carboxyl end group concentration of 50 mmol/kg;

P4) test polymer, based on PBT, with a content of 1% by wt. of sodium-5-sulfoisophthalic acid (CAS. no.: 6362-79-4, sales product of Dynamit Novel) with a J value of 155 ml/g;

P5) Plexiglas 7N (PMMA), a product of Degussa AG, with a molecular weight $M_w$ of 105,000 g/mol; the molecular weight $M_w$ can be determined, for example, by gel permeation chromatography or by scatter light methods (see, for example, H. F. Mark et al., Encyclopedia of Polymer Science and Engineering, 2nd. edition, vol. 10, pages 1 ff., J. Wiley, 1989);

P6) copolymer, based on PMMA with a polymerized comonomer content of 0.5% by wt. of methyl acrylate, 0.3% by wt. of a conversion product made from hydroxyethyl methacrylate with phosphoropentoxide and a molecular weight of $M_w$ of 110,000 g/mol; the molecular weight $M_w$ can be determined, for example, by gel permeation chromatography or by scatter light methods (see, for example, H. F. Mark et al., Encyclopedia of Polymer Science and Engineering, 2nd. edition, vol. 10, pages 1 ff., J. Wiley, 1989).

II. Preparation of the Hybrid Materials

A) Method 1:

One step reprecipitation of unregulated PA 12, according to DE-OS 3510690, with the use of one of the suspensions of S1 to S5 and S7 to S9.

50 kg of an unregulated PA 12, which is prepared by hydrolytic polymerization, with a relative solution viscosity of 1.62 and an end group content of 75 mmol/kg of COOH and/or 69 mmol/kg of $NH_2$, were heated to 145 deg. C. with 290 liters of ethanol, denatured with 2-butanone and 1% water content, and with the amounts of the aforementioned suspensions (listed in Table 1) within a period of 5 hours in a 0.8 $m^3$ stirred vessel and held for 1 hour at this temperature with stirring (blade stirrer, d=80 cm, speed=85 rpm). Then the jacket temperature was reduced to 124 deg. C. Then while the ethanol is continuously removed by distillation, the internal temperature was brought to 125 deg. C. at a cooling rate of 25 K/h at the same stirrer speed. From now on, while using the same cooling rate, the jacket temperature was maintained 2K-3K below the internal temperature, until at 109 deg. C. the precipitation, which was detectable by heat generation, began. The distillation rate was increased until the internal temperature did not exceed 109.3 deg. C. After 20 minutes the internal temperature fell, indicating the precipitation had ended. With further removal by distillation and cooling by way of the jacket, the temperature of the suspension was brought to 45 deg. C.; and, thereafter, the suspension was transferred into a paddle dryer. The ethanol was distilled off at 70 deg. C. and approximately 500 mbar; and then the residue was further dried for 3 hours at 20 mbar and 86 deg. C.

TABLE 1

Preparation of PA12-based hybrid materials, according to method 1

| Example | Suspension | Amount/ kg | BET $m^2/g$ | Bulk density g/l | Ash Content % by wt. |
|---------|-----------|------------|-------------|------------------|----------------------|
| I       | S1        | 34.8       | 12.3        | 383              | 7.8                  |
| II      | S2        | 34.8       | 16.3        | 344              | 7.6                  |
| III     | S3        | 34.8       | 19.7        | 390              | 8.0                  |
| IV      | S3*       | 69.6       | 34.1        | 430              | 15.6                 |
| V       | S3**      | 104.4      | 60.1        | 530              | 23.4                 |
| VI      | S4        | 34.8       | 20.1        | 367              | 7.6                  |
| VII     | S5        | 34.8       | 18.7        | 391              | 7.4                  |
| VIII    | S5*       | 69.6       | 35.3        | 422              | 15.8                 |
| IX      | S7        | 34.8       | 10.2        | 431              | 7.6                  |
| X       | S8        | 34.8       | 14.9        | 387              | 7.8                  |
| XI      | S9        | 34.8       | 32.4        | 321              | 7.2                  |

*batch amount of ethanol was reduced from 290 liters to 275 liters;
*batch amount of ethanol was reduced from 290 liters to 260 liters.

Then the powders, obtained according to method 1, were melted in a twin screw extruder ZSK 25 of the company Coperion at 220 deg. C. and melted, extruded, and pelletized at a rate of 8 kg/h.

B) Method 2:

Tests of the aforementioned organically/inorganic hybrid materials were conducted on a laboratory extrusion system, comprising a single screw extruder with a 45 mm screw diameter and 36 D screw length and a flanged-on, additional single screw extruder with a 45 mm screw diameter and screw length 24 D.

Using a gravimetric metering device, 10 kg/h of polymer pellets (see Table 2) were fed to the draw-in zone of the first extruder. After feeding in a homogeneous thermoplastic melt, 2.0 kg/h of methanol were pumped into the extruder, in a mixing zone, comprising a cavity transfer mixer (CTM), by means of a LEWA metering pump at a pressure of 200 bar. In another mixing zone, which is also provided with a CTM, 1.2 kg/h of the suspension (see Table 2) S6 was pumped into the extruder by means of a diaphragm metering pump.

A pressure holding valve, which had a cylindrical valve core of 3 mm, was mounted on the end of the extruder. Setting the valve at 80% of the valve stroke generated a slit of less than 20 μm, which resulted in a pressure level of 200 bar in the extruder. The measured melt temperature was 250 deg. C.

A direct connection to the downstream extruder was produced over the pressure holding valve. After passing through the shear slit of the pressure holding valve, which occurred at extremely high shear rates, the mixture comprising polymer, solvent, water and the inorganic particles incorporated therein was expanded; the volatile fractions evaporated and drawn off over two degassing openings. The degassing zones were operated at various pressure levels and were separated by vacuum technology.

The polymer melt, which was freed of the volatile fractions, was formed into rods via a perforated die, drawn off over a water bath, and chopped by means of a pelletizer.

TABLE 2

Hybrid materials prepared from the polymers and suspensions, according to method 2

| Example | Polymer | Suspension | Ash Content % by wt. |
|---|---|---|---|
| XII | P2 | S4 | 5.9 |
| XIII | P2 | S5 | 6.1 |
| XIV | P2 | S8 | 5.8 |
| XV | P2 | S9 | 6.2 |
| XVI (Comp.) | P3 | S6 | 5.5 |
| XVII | P4 | S6 | 5.7 |
| XVIII (Comp.) | P5 | S4 | 6.1 |
| XIX (Comp.) | P5 | S5 | 6.2 |
| XX | P6 | S4 | 5.9 |
| XXI | P6 | S5 | 5.8 |

III. Test of the Hybrid Materials

Test specimens in the form of shoulder neck rods and rectangular rods were made from the materials I to XX by the injection molding process. Then the following mechanical characteristics were determined in accordance with the specified ISO methods.

tensile test in accordance with ISO 572 (modulus of elasticity, tensile strength, elongation at break, crack resistance and crack propagation);

flexural test in accordance with ISO 178 (modulus of elasticity from flexural test and flexural strength);

impact strength in accordance with ISO 1791e/U (at 23 deg. C. and 40 deg. C.);

notched impact strength in accordance with ISO 179 le/A (at 23 deg. C. and 40 deg. C.);

heat resistance in accordance with ISO 75 (HDT A and HDT B);

Vicat temperatures in accordance with ISO 306 (Vicat A and Vicat B):

Outer fiber strain (in accordance with ISO 178)

The results of the tests are listed in Table 3.

TABLE 3

| Characteristic | I | II | III | IV | V | VI | VII | VIII |
|---|---|---|---|---|---|---|---|---|
| Modulus of elasticity MPa | 1821 | 1790 | 1811 | 2042 | 2203 | 1843 | 1709 | 2009 |
| Tensile strength N/mm$^2$ | 51 | 49 | 51 | 53 | 55 | 41 | 49 | 53 |
| Elongation at break % | 4.5 | 4.9 | 5.2 | 5.4 | 6.7 | 5.1 | 5.2 | 5.0 |
| Crack strength N/mm$^2$ | 37 | 38 | 45 | 47 | 51 | 47 | 45 | 43 |
| Crack propagation % | 150 | 210 | 180 | 160 | 130 | 190 | 170 | 140 |
| Modulus of elasticity from flexural test MPa | 1790 | 1721 | 1801 | 2012 | 2198 | 1819 | 1723 | 2051 |
| Flexural strength MPa | 60 | 55 | 59 | 62 | 72 | 63 | 58 | 56 |
| Outer fiber strain % | 4.5 | 4.5 | 5.1 | 5.4 | 6.0 | 5.3 | 5.1 | 5.0 |
| Impact strength 23 deg. C. Number of fractures of 10 specimens | 0 | 0 | 0 | 0 | 0 | 0 | 0 | 0 |
| Impact strength −40 deg. C. Number of fractures of 10 specimens | 0 | 0 | 0 | 0 | 0 | 0 | 0 | 0 |
| Notched impact strength 23 deg. C. kJ/m$^2$ | 5 | 5 | 5.3 | 5.5 | 5.9 | 5.3 | 5.4 | 5.7 |
| Notched impact strength −40 deg. C. kJ/m$^2$ | 6 | 6 | 5.9 | 6.1 | 7 | 5.8 | 6.1 | 6.2 |
| Vicat A deg. C. | 175 | 176 | 176 | 178 | 179 | 175 | 174 | 175 |
| Vicat B deg. C. | 155 | 157 | 157 | 159 | 162 | 155 | 156 | 154 |
| HDT A deg. C. | 52 | 51 | 55 | 61 | 69 | 53 | 54 | 57 |
| HDT B deg. C. | 148 | 151 | 153 | 155 | 161 | 151 | 152 | 156 |

| Characteristic | IX | X | XI | XII | XIII | XIV | XV | XVI | XVII |
|---|---|---|---|---|---|---|---|---|---|
| Modulus of elasticity MPa | 1820 | 1721 | 1691 | 1478 | 1456 | 1484 | 1460 | 2624 | 2731 |
| Tensile strength N/mm$^2$ | 55 | 51 | 48 | 47 | 49 | 44 | 43 | — | 61 |
| Elongation at break % | 7 | 5.2 | 5.3 | 10.7 | 9.7 | 9.7 | 7.3 | — | 5.1 |
| Crack strength N/mm$^2$ | 48 | 47 | 38 | 52 | 53 | 51 | 51 | 54 | 62 |
| Crack propagation % | 150 | 130 | 230 | 150 | 210 | | | 3.4 | 100 |
| Modulus of elasticity from flexural test MPa | 1796 | 1730 | 1713 | N/A | N/A | N/A | N/A | 2584 | 2719 |
| Flexural strength MPa | 58 | 57 | 54 | N/A | N/A | N/A | N/A | 96 | 102 |
| Outer fiber strain % | 5.9 | 5.1 | 4.5 | N/A | N/A | N/A | N/A | 6 | 6.1 |
| Impact strength 23 deg. C. Number of fractures of 10 specimens | 0 | 0 | 0 | 0 | 0 | 0 | 0 | 0 | 0 |
| Impact strength −40 deg. C. Number of fractures of 10 specimens | 0 | 0 | 0 | 0 | 0 | 0 | 0 | 0 | 0 |
| Notched impact strength 23 deg. C. kJ/m$^2$ | 5.6 | 5.6 | 5.2 | 6.3 | 6.2 | 6.0 | 6.2 | 4.6 | 6.3 |
| Notched impact strength −40 deg. C. kJ/m$^2$ | 6.1 | 6.1 | 5.4 | 6.3 | 6.4 | 6.1 | 6.1 | 3.9 | 6.4 |
| Vicat A deg. C. | 176 | 176 | 175 | N/A | N/A | N/A | N/A | 218 | 220 |
| Vicat B deg. C. | 153 | 155 | 153 | N/A | N/A | N/A | N/A | 181 | 189 |

TABLE 3-continued

| | | | | | | | | | |
|---|---|---|---|---|---|---|---|---|---|
| HDT A deg. C. | 52 | 51 | 49 | 48 | 47 | 56 | 49 | 53 | 63 |
| HDT B deg. C. | 155 | 156 | 145 | 149 | 147 | 143 | 139 | 177 | 185 |

| Characteristic | XVII | XIX | XX | XXI |
|---|---|---|---|---|
| Modulus of elasticity MPa | 3307 | 3297 | 3485 | 3492 |
| Tensile strength N/mm$^2$ | — | — | 81.1 | 82.3 |
| Elongation at break % | — | — | 6.1 | 5.9 |
| Crack strength N/mm$^2$ | 74 | 66.3 | 80.3 | 82 |
| Crack propagation % | 2.8 | 2.2 | 7.3 | 7.5 |
| Impact strength 23 deg. C. kJ/m$^2$ | 18 | 16.2 | 23 | 24 |
| Impact strength −40 deg. C. kJ/m$^2$ | 17.1 | 15.5 | 22 | 24 |
| Notched impact strength 23 deg. C. kJ/m$^2$ | 1.2 | 1.1 | 2.2 | 2.4 |
| Notched impact strength −40 deg. C. kJ/m$^2$ | 1.2 | 1.1 | 2 | 2.4 |
| HDT A deg. C. | 86 | 80 | 92 | 93 |
| HDT B deg. C. | 100 | 100 | 107 | 108 |

TABLE 4

Properties of the starting polymers

| Characteristic | P1 | P2 | P3 | P4 | P5 | P6 |
|---|---|---|---|---|---|---|
| Modulus of elasticity MPa | 1412 | 1401 | 2488 | 2400 | 3253 | 3190 |
| Tensile strength N/mm$^2$ | 44 | 44 | 57 | 55 | — | — |
| Elongation at break % | 5 | 5 | 3.7 | 7.3 | — | — |
| Crack strength N/mm$^2$ | 37 | 35 | 35.6 | 37.9 | 82 | 61 |
| Crack propagation % | 150 | 290 | 163 | 130 | 3.9 | 2.6 |
| Modulus of elasticity from flexural test MPa | N/A | N/A | 2400 | 2380 | N/A | N/A |
| Flexural strength MPa | N/A | N/A | 91.6 | 85 | N/A | N/A |
| Outer fiber strain % | N/A | N/A | 6.1 | 5.9 | N/A | N/A |
| Impact strength 23 deg. C. Number of fractures of 10 specimens | 0 | 0 | 0 | 0 | 10 (23 kJ/m$^2$) | 10 (18 kJ/m$^2$) |
| Impact strength −40 deg. C. Number of fractures of 10 specimens | 0 | 0 | 0 | 0 | 10 (21 kJ/m$^2$) | 18 (18 kJ/m$^2$) |
| Notched impact strength 23 deg. C. kJ/m$^2$ | 4.8 | 5.5 | 6.4 | 6.1 | 1.8 | 2.2 |
| Notched impact strength −40 deg. C. kJ/m$^2$ | 5.0 | 5.4 | 5.3 | 5.2 | 1.9 | 1.9 |
| Vicat A deg. C. | N/A | N/A | 220 | 215 | N/A | N/A |
| Vicat B deg. C. | N/A | N/A | 183 | 179 | N/A | N/A |
| HDT A deg. C. | 44 | 48 | 56 | 49 | 84 | 84 |
| HDT B deg. C. | 141 | 133 | 143 | 139 | 97 | 99 |

IV. Preparation of the Hybrid Materials for the Comparison Tests

P1 was reacted, according to method 1, for the tests with the comparison suspensions S1 to S13. In addition, the polymers P5 and P5 were reacted, according to method 2, with the suspensions S10 to S13.

TABLE 5

Comparison tests for preparing PA12-based hybrid materials, according to method 1

| Example | Suspension | Amount/ kg | BET m$^2$/g | Bulk density g/l | Ash Content % by wt. |
|---|---|---|---|---|---|
| XXII | S10 | 34.8 | 26.2 | 311 | 7.8 |
| XXIII | S11 | 34.8 | 29.1 | 316 | 7.6 |
| XXIV | S12 | 34.8 | 14.5 | 383 | 8.0 |
| XXV | S13 | 34.8 | 15.6 | 404 | 7.9 |

Then the powders (XXII to XXV), obtained according to method 1, were melted, extruded, and pelletized in a twin screw extruder ZSK 25 of the company Coperion at a rate of 8 kg/h at 220 deg. C.

TABLE 6

Comparison tests with respect to the hybrid materials prepared from polymers and suspensions, according to method 2

| Example | Polymer | Suspension | Ash Content % by wt. |
|---|---|---|---|
| XXVI | P5 | S10 | 6.1 |
| XXVII | P5 | S11 | 5.8 |
| XXVIII | P5 | S12 | 5.7 |
| XXIX | P5 | S13 | 5.5 |
| XXX | P6 | S10 | 5.6 |
| XXXI | P6 | S11 | 5.3 |
| XXXII | P6 | S12 | 5.6 |
| XXXIII | P6 | S13 | 5.3 |

V. Test of the Hybrid Materials from the Comparison Tests

Test specimens in the form of shoulder neck rods and rectangular rods were made from the materials XXII to XXIII by the injection molding process. Then the following mechanical characteristics were determined.

TABLE 7

Properties of the non-inventive hybrid materials (comparison materials) prepared according to method 1

| Characteristic | XXII | XXIII | XXIV | XXV | XXVI | XXVII |
|---|---|---|---|---|---|---|
| Modulus of elasticity MPa | 1593 | 1609 | 1673 | 1633 | 3285 | 3298 |
| Tensile strength N/mm² | — | 36 | — | 38 | — | — |
| Elongation at break % | — | 4.5 | — | 5.1 | — | — |
| Crack strength N/mm² | 41 | 43 | 39 | 41 | 60 | 64 |
| Crack propagation % | 15 | 40 | 9 | 33 | 2.3 | 2.1 |
| Impact strength 23 deg. C. Number of fractures of 10 specimens | 10 | 2 | 10 | 3 | 11.1 | 12.4 |
| Impact strength −40 deg. C. Number of fractures of 10 specimens | 10 | 4 | 10 | 6 | 9.7 | 10.3 |
| Notched impact strength 23 deg. C. kJ/m² | 3.1 | 4.2 | 3.5 | 4.1 | 1.2 | 1.3 |
| Notched impact strength −40 deg. C. kJ/m² | 3.2 | 4.3 | 3.3 | 4.2 | 1.1 | 0.9 |
| HDT A deg. C. | 47 | 46 | 51 | 49 | 85 | 82 |
| HDT B deg. C. | 140 | 140 | 143 | 145 | 95 | 97 |

Properties of the non-inventive hybrid materials prepared according to method 2

| Characteristic | XXVIII | XXIX | XXX | XXXI | XXXIII | XXIII |
|---|---|---|---|---|---|---|
| Modulus of elasticity MPa | 3321 | 3195 | 3098 | 3084 | 2951 | 3042 |
| Tensile strength N/mm² | — | — | — | — | — | — |
| Elongation at break % | — | — | — | — | — | — |
| Crack strength N/mm² | 63 | 67 | 54 | 59 | 56 | 57 |
| Crack propagation % | 1.8 | 2.1 | 2.1 | 2.2 | 2.3 | 1.9 |
| Impact strength 23 deg. C. kJ/m² | 10.8 | 12.3 | 11.5 | 11.6 | 12.0 | 12.7 |
| Impact strength −40 deg. C. kJ/m² | 11.1 | 11.5 | 10.9 | 10.4 | 11.1 | 10.9 |
| Notched impact strength 23 deg. C. kJ/m² | 1.1 | 1.3 | 1.6 | 1.2 | 1.1 | 1.4 |
| Notched impact strength −40 deg. C. kJ/m² | 1.1 | 1.2 | 1.2 | 0.9 | 0.8 | 1.2 |
| HDT A deg. C. | 82 | 84 | 87 | 82 | 86 | 84 |
| HDT B deg. C. | 96 | 95 | 96 | 100 | 97 | 95 |

The comparison data from Table 7 show that without the use of globular, fractal, preferably ceramic particles, the desired improvement in the properties cannot be achieved.

Furthermore, the comparison tests XVI, XVIII and XIX show that in certain cases even a modification of the polymer main chain is necessary in order to achieve the desired improvements in the properties.

The invention claimed is:

1. A composition comprising a nanocomposite and optional additives, wherein:
   A) said nanocomposite comprises:
      a) 20 to 99.9% by wt. of an organic polymer as a matrix and
      b) 0.1 to 80% by wt. of inorganic particles as filler, wherein:
         i) the sum of said organic polymer and said inorganic particles amounts to 100% by wt. of said nanocomposite;
         ii) said inorganic particles are aggregates of globular primary particles with a size in the range of 0.5 nm to less than 100 nm;
         iii) the volume-weighted median value $d_{50}$ of said inorganic particles is between 0.05 μm and 0.5 μm, as determined by means of static light scattering; and
         iv) said inorganic particles comprise at least three types of functional groups of varying reactivity;
   B) said optional additives comprise 0 to 100 parts by weight of said composition, wherein the content of the additives relates to the sum of a) and b), calculated as 100 parts by weight.

2. The composition of claim 1, wherein said inorganic particles comprise oxidic, nitridic and carbidic metal and semi-metal compounds.

3. The composition of claim 1, wherein said inorganic particles are aggregates of globular primary particles with a size of 1-50 nm.

4. The composition of claim 1, wherein said inorganic particles are aggregates of globular primary particles with a size of 5-30 nm.

5. The composition of claim 1, wherein the volume-weighted median value $d_{50}$ of said inorganic particles is between 0.1 μm and 0.3 μm, as determined by means of static light scattering.

6. The composition of claim 1, wherein the volume-weighted median value $d_{50}$ of said inorganic particles is between 0.15 μm and 0.25 μm, as determined by means of static light scattering.

7. The composition of claim 1, wherein said nanocomposite comprises said organic polymer in an amount ranging from 40 to 99.5% by wt. and said inorganic particles in an amount ranging from 0.5 to 60% by wt.

8. The composition of claim 1, wherein said nanocomposite comprises said organic polymer in an amount ranging from 50 to 99% by wt. and said inorganic particles b) in an amount ranging from 1 to 50% by wt.

9. The composition of claim 1, wherein the surface of said inorganic particles is modified with organic groups.

10. The composition of claim 9, wherein said inorganic particles comprise groups which can interact with said polymer in the manner of a van der Waals bond, hydrogen bridge bond, an electrostatic bond, ionic bond and/or a coordinative bond and/or can enter with the polymer into a covalent bond.

11. The composition of claim 10, wherein said inorganic particles comprise organic groups as well as OH groups and mineral acid groups.

12. The composition of claim 1, wherein said inorganic particles exhibit a fractality in a range of 2 to less than 3, as determined by means of $N_2$ adsorption in a pressure range $p/p_o$ of 0.5 to 0.8.

13. The composition of claim 12, wherein said primary particles exhibit a fractality of less than 2.8.

14. The composition of claim 12, wherein said primary particles exhibit a fractality of less than 2.6.

15. A process for preparing the composition of claim 1, comprising:

a) dispersing inorganic particles which are organically modified on their surface in an organic solvent under shearing conditions to form a dispersion; and b) mixing the dispersion of step a) with an organic polymer and optionally, with additives to form the composition of claim 1.

16. The process of claim 15, wherein, in step a), a predispersion is first prepared, conveyed through a high energy mixer at a pressure of more than 2,000 bar and, thereafter, the dispersion, which is obtained by milling at a high energy input, is stabilized with an organic acid.

17. The process of claim 15, wherein, in step b), a solution comprising polymer, particles, and, optionally, additives is prepared by raising the temperature of the mixture and then the composition is settled out by lowering the temperature.

18. The process, of claim 15, wherein, in step b) the polymer, particles and the optional additives are mixed in an extruder.

19. A product comprising the composition of claim 1, wherein said product is a fiber, film or shaped article.

20. The product of claim 19, wherein said product is a shaped article.

* * * * *